(12) United States Patent
Ito et al.

(10) Patent No.: US 10,426,084 B2
(45) Date of Patent: Oct. 1, 2019

(54) MOWER CAPABLE OF EFFECTIVELY COOLING A MOTOR

(71) Applicant: KUBOTA CORPORATION, Osaka (JP)

(72) Inventors: Hirokazu Ito, Osaka (JP); Yoshikazu Togoshi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/640,411

(22) Filed: Mar. 6, 2015

(65) Prior Publication Data
US 2015/0359170 A1    Dec. 17, 2015

(30) Foreign Application Priority Data

Jun. 16, 2014   (JP) ................. 2014-123823

(51) Int. Cl.
*A01D 34/78*   (2006.01)

(52) U.S. Cl.
CPC .................... *A01D 34/78* (2013.01)

(58) Field of Classification Search
CPC ..................................................... A01D 34/78
See application file for complete search history.

(56) References Cited

U.S. PATENT DOCUMENTS

| | | | | |
|---|---|---|---|---|
| 3,044,239 A * | 7/1962 | Harkness | ........... | A01D 34/6806 123/185.14 |
| 3,077,664 A * | 2/1963 | Murawski | ............. | A01D 34/78 30/228 |
| 3,221,481 A * | 12/1965 | Mattson | ................. | A01D 34/84 56/16.9 |
| 3,230,695 A * | 1/1966 | West | ................... | A01D 34/6806 318/762 |
| 3,593,505 A * | 7/1971 | Mittelstadt | ............. | A01D 34/78 56/12.8 |
| 4,276,737 A * | 7/1981 | Henning | .............. | A01D 34/695 56/12.8 |
| 4,407,112 A * | 10/1983 | Shepherd | ............ | A01D 43/077 56/13.4 |

(Continued)

FOREIGN PATENT DOCUMENTS

| | | | |
|---|---|---|---|
| DE | 3232895 A1 * | 3/1984 | ............. A01D 34/78 |
| JP | 51-102980 | 9/1976 | |

(Continued)

OTHER PUBLICATIONS

U.S. Appl. No. 14/640,545 to Hirokazu Ito et al., which was filed on Mar. 6, 2015.

(Continued)

*Primary Examiner* — Alicia Torres
*Assistant Examiner* — Adam J Behrens
(74) *Attorney, Agent, or Firm* — Greenblum & Bernstein, P.L.C.

(57) ABSTRACT

A mower includes a rotary grass cutting blade. A mower deck houses the rotary blade in an interior thereof. A motor has at least a portion thereof positioned or extending into the interior of the mower deck. The motor rotationally drives the rotary blade. A guide member can be utilized to form an air flow passage along the motor, with the air flow passage connecting the interior and exterior of the mower deck.

18 Claims, 22 Drawing Sheets

(56) References Cited

U.S. PATENT DOCUMENTS

| | | | | |
|---|---|---|---|---|
| 4,882,896 A * | 11/1989 | Wilcox | A01D 69/02 | 56/10.5 |
| 5,819,513 A * | 10/1998 | Braun | A01D 34/6806 | 56/11.9 |
| 5,894,715 A * | 4/1999 | Braun | A01D 34/6806 | 56/11.9 |
| 7,707,812 B2 * | 5/2010 | Cheung | A01D 34/68 | 56/15.8 |
| 8,429,885 B2 * | 4/2013 | Rosa | A01D 34/69 | 56/11.9 |
| 8,575,800 B1 | 11/2013 | Fox | | |
| 8,931,245 B2 * | 1/2015 | Roberge | A01D 34/78 | 318/268 |
| 2003/0037525 A1 * | 2/2003 | Iida | A01D 34/78 | 56/11.9 |
| 2006/0059879 A1 * | 3/2006 | Edmond | A01D 34/006 | 56/6 |
| 2007/0125056 A1 | 6/2007 | Edmond | | |
| 2008/0088266 A1 * | 4/2008 | Lucas | A01D 69/025 | 318/441 |
| 2009/0183482 A1 * | 7/2009 | Cheung | A01D 34/68 | 56/17.1 |
| 2011/0088362 A1 * | 4/2011 | Rosa | A01D 34/69 | 56/11.9 |
| 2011/0179757 A1 * | 7/2011 | Scott-Stanbridge | A01D 34/695 | 56/12.8 |
| 2011/0239613 A1 * | 10/2011 | Isono | A01D 34/78 | 56/202 |
| 2012/0242185 A1 * | 9/2012 | Tanimoto | A01D 34/78 | 310/208 |
| 2012/0317949 A1 * | 12/2012 | Abe | A01D 34/6818 | 56/10.5 |
| 2013/0152535 A1 * | 6/2013 | Roberge | A01D 34/78 | 56/10.2 R |
| 2014/0144117 A1 * | 5/2014 | Schygge | B60L 11/18 | 56/10.7 |
| 2014/0165524 A1 * | 6/2014 | Schygge | B60L 8/003 | 56/10.7 |

FOREIGN PATENT DOCUMENTS

| | | |
|---|---|---|
| JP | 2-83717 | 6/1990 |
| JP | 8-322357 | 12/1996 |
| JP | 2012-170336 | 9/2012 |
| JP | 2013-21921 | 2/2013 |

OTHER PUBLICATIONS

Japanese Office Action issued in JP 2014-123823 and dated Feb. 10, 2017 (with English translation).

* cited by examiner

MOWER CAPABLE OF EFFECTIVELY COOLING A MOTOR

CROSS-REFERENCE TO RELATED APPLICATIONS

The present application claims priority under 35 U.S.C. § 119 of Japanese Application No. 2014-123823, filed on Jun. 16, 2014, the disclosure of which is expressly incorporated by reference herein in its entirety.

BACKGROUND OF THE INVENTION

1. Field of the Invention

The present invention relates to a mower technology that includes a motor rotationally driving a rotary blade.

2. Description of Related Art

Conventionally, a mower technology that includes a motor rotationally driving a rotary blade is well known, such as that described in Japanese Patent Laid-open Publication No. 2013-021921.

Japanese Patent Laid-open Publication No. 2013-021921 describes a mower (mower deck unit) that includes a mower deck housing a rotary blade (mower blade) in an interior thereof; and a motor (mower motor) rotationally driving the rotary blade. The motor is fixated on a top surface of the mower deck by bolts. In the mower configured in this way, grass (a lawn) can be mowed by driving the motor and rotationally driving the rotary blade.

In the mower configured in this way, when the rotary blade is rotationally driven, heat is produced by the motor. Therefore, a mower capable of effectively cooling a hot motor is preferred.

SUMMARY OF THE INVENTION

In view of the above-noted circumstances, the present invention provides a mower capable of effectively cooling a motor.

Specifically, a mower according to one aspect of the present invention includes a rotary blade cutting grass due to being rotationally driven; a mower deck housing the rotary blade in an interior thereof; and a motor of which at least a portion is positioned in the interior of the mower deck, the motor rotationally driving the rotary blade.

According to another aspect of the present invention, the motor includes a casing member which forms an interior space, and at least a portion of the casing member is positioned in the interior of the mower deck.

According to another aspect of the present invention, the motor includes a rotor and a stator, which obtain rotational drive power, and at least a portion of the rotor or at least a portion of the stator is positioned in the interior of the mower deck.

According to another aspect of the present invention, the motor includes the rotor and the stator, which obtain rotational drive power, and at least a portion of the rotor and at least a portion of the stator are positioned in the interior of the mower deck.

According to another aspect of the present invention, the mower further includes a guide member forming an air flow passage along the motor, the air flow passage connecting the interior and exterior of the mower deck.

According to another aspect of the present invention, the guide member includes a first guide member positioned so as to face a side surface of the motor.

According to another aspect of the present invention, the motor includes at least one fin, which is formed so as to extend outward from the side surface, and such that an outer edge portion of the fin touches the first guide member.

According to another aspect of the present invention, the guide member includes a second guide member positioned so as to face a bottom surface of the motor.

According to another aspect of the present invention, the mower further includes a fan, which sends air from the exterior of the mower deck to the interior via the air flow passage.

According to another aspect of the present invention, the mower further includes the fan, which is positioned below the motor and sends air from the exterior of the mower deck to the interior via the air flow passage, the mower having the second guide member formed by the top surface of the fan.

According to another aspect of the present invention, the fan is driven by the motor.

Effects of the present invention are as follows.

The motor can be cooled effectively by the airflow generated within the mower deck accompanying rotation of the rotary blade.

The casing member of the motor can be cooled by air flowing within the mower deck.

The rotor or stator of the motor can be cooled by air flowing within the mower deck.

The rotor and the stator of the motor can be cooled by air flowing within the mower deck.

The motor can be cooled effectively by air flowing from the exterior of the mower deck to the interior (or from the interior to the exterior).

The side surface of the motor can be cooled effectively.

A surface area of the motor can be increased, and the motor can be cooled effectively. In addition, heat can be dissipated via the fin and the first guide member, and the motor can be cooled more effectively.

The bottom surface of the motor can be cooled effectively.

An amount of airflow can be increased, and the motor can be cooled more effectively.

The fan and the second guide member can serve dual purposes.

There is no need to provide a separate drive source driving the fan.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
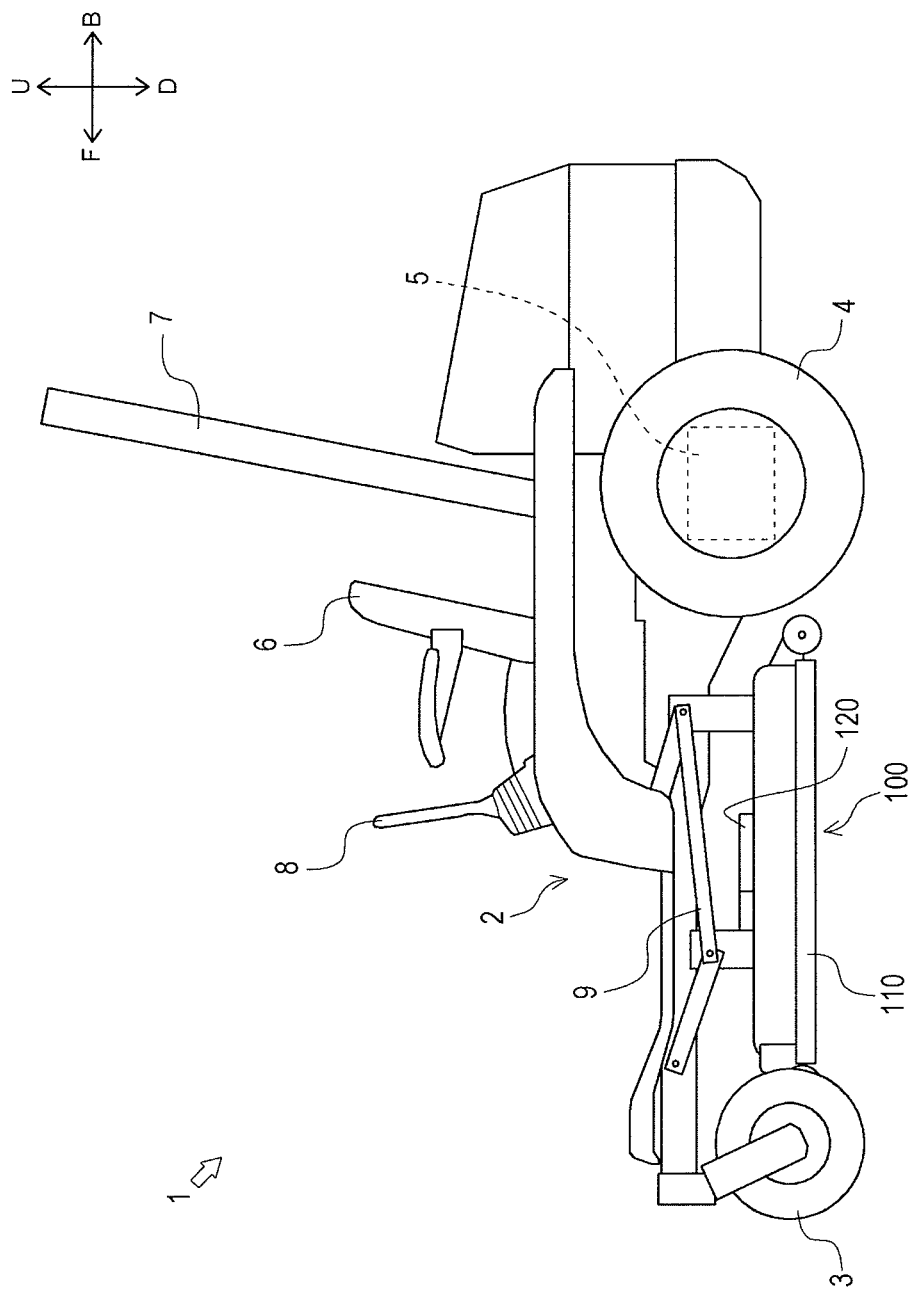
FIG. 1 is a lateral view illustrating an overall configuration of a lawn mower.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

In the following, directions indicated in the drawings by arrows U, D, F, B, L, and R shall be defined in the description as an upward direction, a downward direction, a forward (front) direction, a rearward (back) direction, a left direction, and a right direction, respectively.

Figure 2:
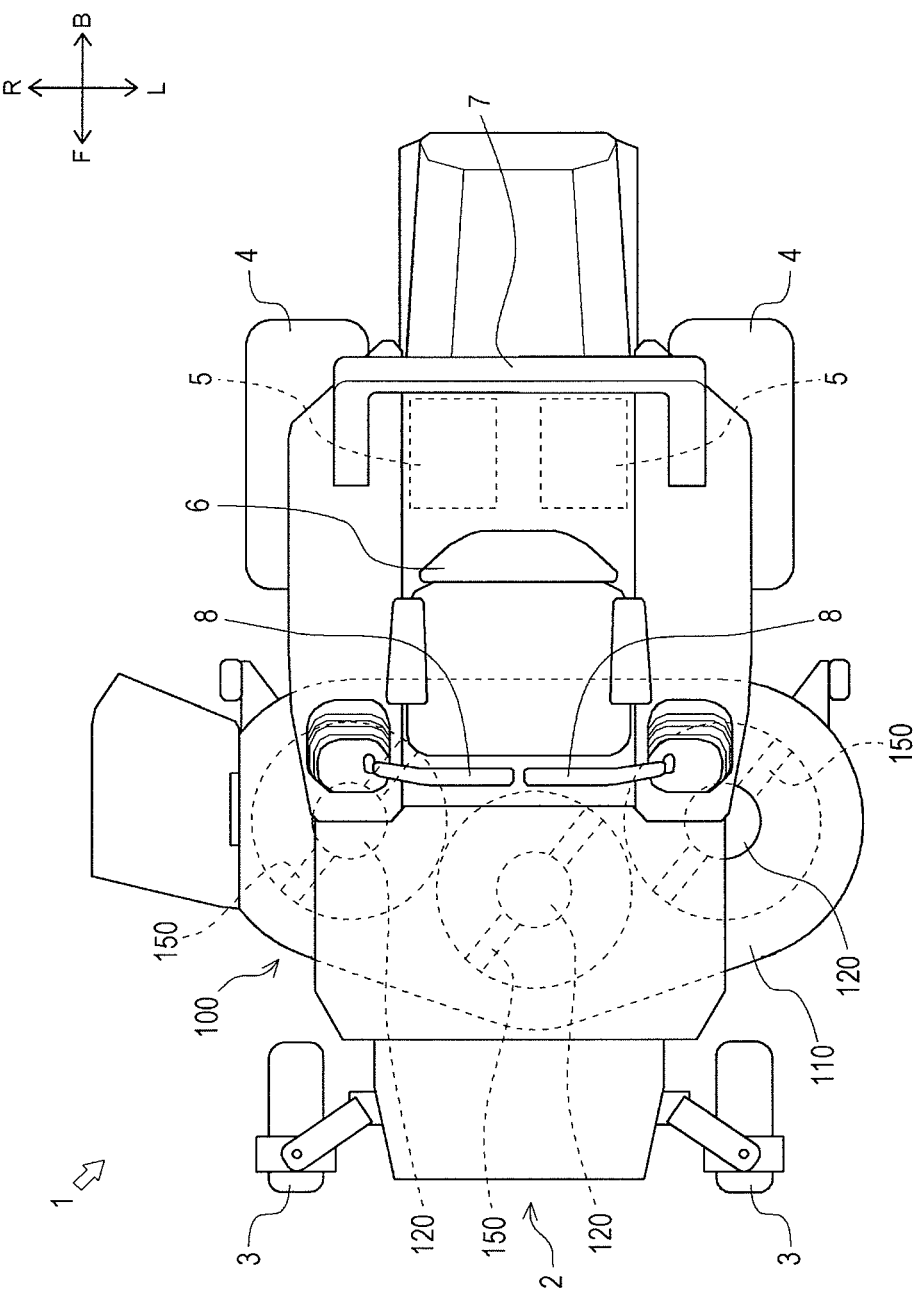
FIG. 2 is a plan or top view of the same.
Figure 3:
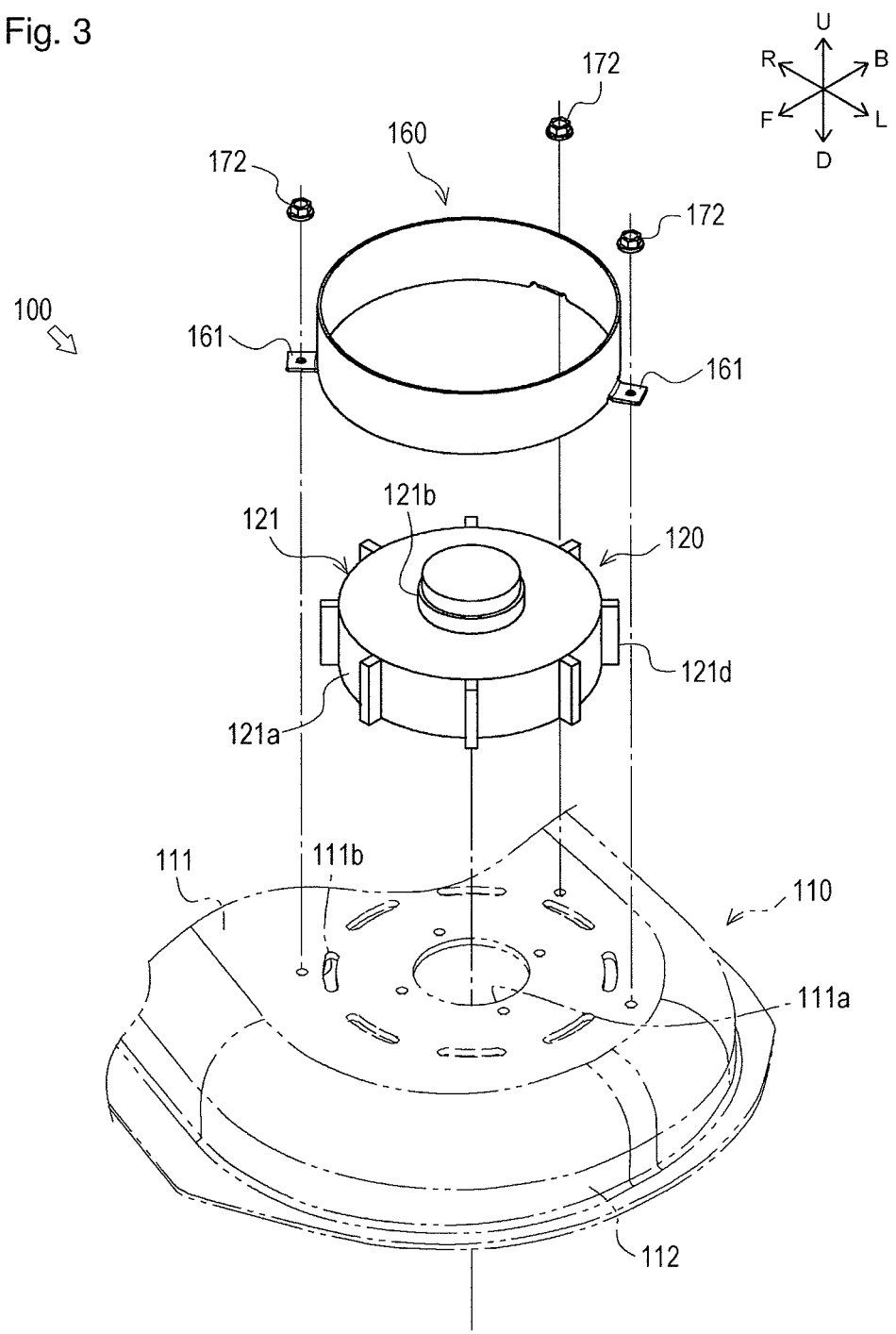
FIG. 3 is an overhead exploded perspective view of a top portion of a mower according to a first embodiment.

First, with reference to FIGS. 1 and 2, an overall configuration of a lawn mower 1 equipped with a mower 100 is described.

The lawn mower 1 is a work vehicle capable of mowing grass (a lawn) while traveling. The lawn mower 1 includes primarily a traveling vehicle body 2, front wheels 3, drive wheels 4, a travel motor 5, a driver's seat 6, a protective frame 7, a travel lever(s) 8, a link mechanism 9, and the mower 100.

A front portion of the traveling vehicle body 2 is supported by a left-right pair of the front wheels 3, which are coupled wheels (non-drive wheels). A rear portion of the traveling vehicle body 2 is supported by a left-right pair of the drive wheels 4. A left-right pair of the travel motors 5 are provided in respective interiors of the left-right pair of drive wheels 4. The left travel motor 5 is coupled to the left drive wheel 4, and the right travel motor 5 is coupled to the right drive wheel 4.

The driver's seat 6, where a worker or operator sits, is provided at a front-back direction middle portion of the traveling vehicle body 2. The protective frame 7, which protects the worker, is provided to the rear of the driver's seat 6. A left-right pair of the travel levers 8 are provided to the left and right of the driver's seat 6. The mower 100 is located in a bottom portion of the traveling vehicle body 2 (between the front wheels 3 and the drive wheels 4) and supported via the link mechanism 9.

The worker can control driving revolutions of each of the left-right pair of travel motors 5 by operating the respective travel lever 8. Thereby, the worker can independently drive each of the left-right pair of the drive wheels 4 as desired. In this way, the lawn mower 1 can be made to advance forward and rearward or to turn due to the worker operating the travel levers 8. In addition, by driving the mower 100, the worker can perform mowing work (grass-cutting work).

Next, with reference to FIGS. 3 to 9, a configuration of the mower 100 (and in particular, a configuration related to a work motor 120 described hereafter) according to a first embodiment of the present invention is described.

The mower 100 is a work apparatus that cuts grass growing below the mower 100 such that the grass is a predetermined length (height). The mower 100 includes primarily a mower deck 110, a work motor 120, a spacer 130, a fan 140, a rotary blade 150, a first shroud 160, and a second shroud 170.

For ease of description in the following, only a configuration in a vicinity of a left end portion of the mower 100 is described. More specifically, the mower 100 according to the present embodiment includes a plurality of (e.g., three) work motors 120 (see FIG. 2); however, in the following, only the configuration of the work motor 120 in the left-most position and an area around this work motor 120 are described.

The mower deck 110 shown in FIGS. 3 to 8 forms a principal structure of the mower 100. The mower deck 110 includes primarily a top surface 111 and a side surface 112.

The top surface 111 is a plate-shaped portion formed so as to be substantially horizontal. The top surface 111 is formed such that a length direction thereof is oriented along the left-right direction. The side surface 112 is a portion formed so as to extend downward from an outer peripheral end of the top surface 111. The top surface 111 and the side surface 112 can be integrally formed. A connection portion between the top surface 111 and the side surface 112 is formed so as to create a smoothly curved surface. A space covered from above and laterally is formed in an interior of the mower deck 110 by the top surface 111 and the side surface 112. Primarily, a center hole 111a and a communicating hole(s) 111b are formed on the top surface 111.

The center hole 111a is formed so as to run through the top surface 111 vertically. The center hole 111a is formed to have a round shape in a plan or top view.

The communicating hole(s) 111b is formed so as to run through the top surface 111 vertically. A plurality of the communicating holes 111b (eight in the present embodiment) can be formed around a periphery of the center hole 111a. The communicating holes 111b are formed at equal intervals along a circumference centered on the center hole 111a.

The work motor 120 shown in FIGS. 3, 5, 7, and 8 rotationally drives the rotary blade 150 (described below)

using electric power. The work motor 120 includes primarily a housing 121, a shaft 122, a rotor 123, and a stator 124.

The housing 121 forms a principal structure of the work motor 120. The housing 121 includes primarily a main body 121a, a top portion 121b, and a bottom portion 121c.

The main body 121a is formed in a substantially cylindrical shape having an axis line oriented in the vertical direction. A diameter of the main body 121a is formed so as to be smaller than a diameter of a circumference formed by the communicating holes 111b of the mower deck 110.

The top portion 121b and bottom portion 121c are formed in a substantially cylindrical shape having an axis line oriented in the vertical direction. The top portion 121b is integrally formed with a top surface of the main body 121a. The bottom portion 121c is integrally formed with a bottom surface of the main body 121a. The top portion 121b and bottom portion 121c are formed on the axis line of the main body 121a. The diameter of the bottom portion 121c is formed so as to be substantially identical to the diameter of the center hole 111a of the mower deck 110.

In an interior of the housing 121, which is a casing member formed in the above way, a space is formed where various components are placed. Fins 121d are formed on the housing 121.

The fins 121d are formed in substantially a rectangular plate shape, and are formed so as to span from a top edge to a bottom edge of the main body 121a. A plurality of the fins 121d (eight in the present embodiment) are formed on the side surface of the main body 121a. The fins 121d are formed so as to extend radially outward from the side surface of the main body 121a. A surface area of the housing 121 can be increased by the formation of the fins 121d.

Figure 5:
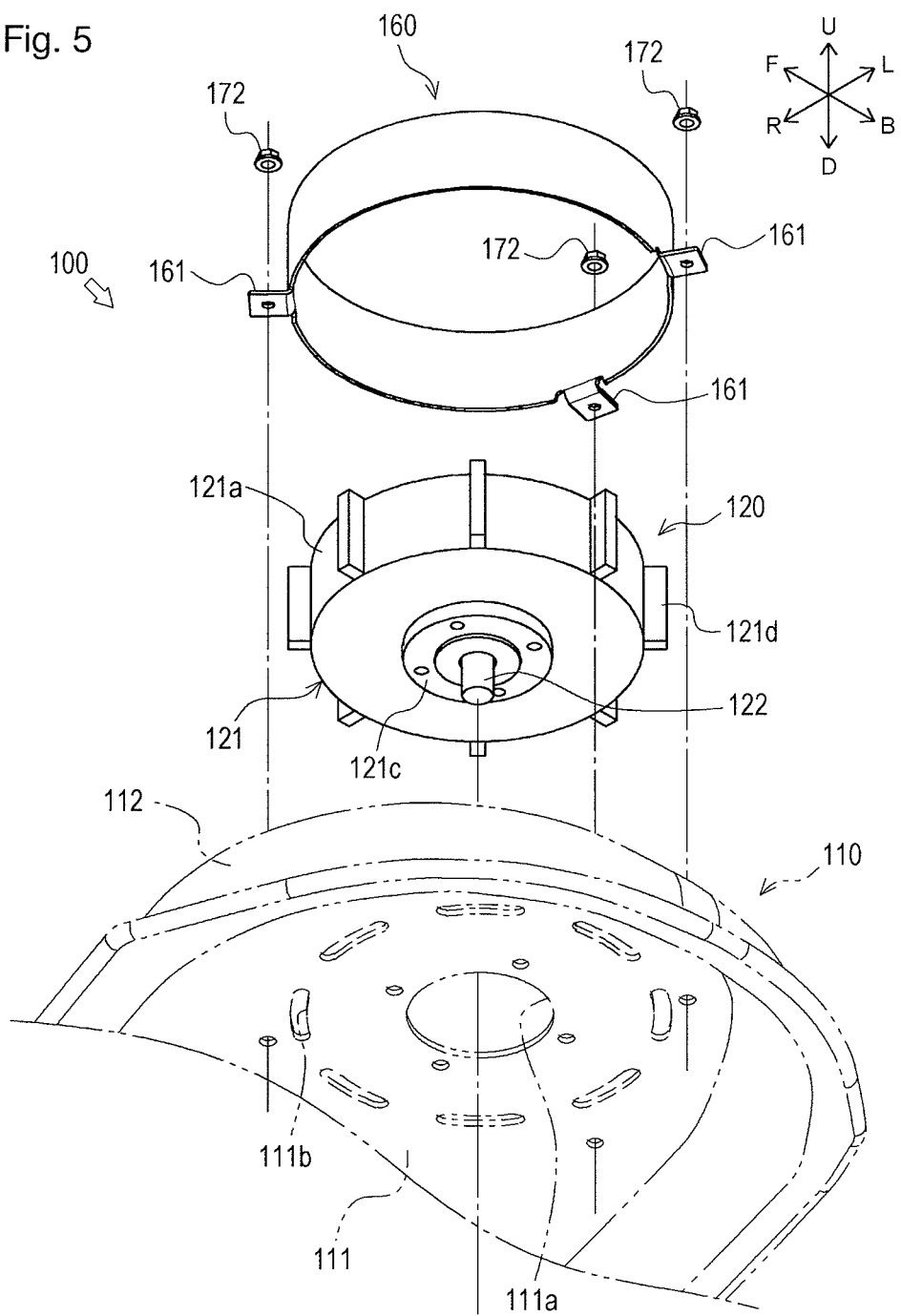
FIG. 5 is an underside exploded perspective view of the top portion of the mower.
Figure 8:
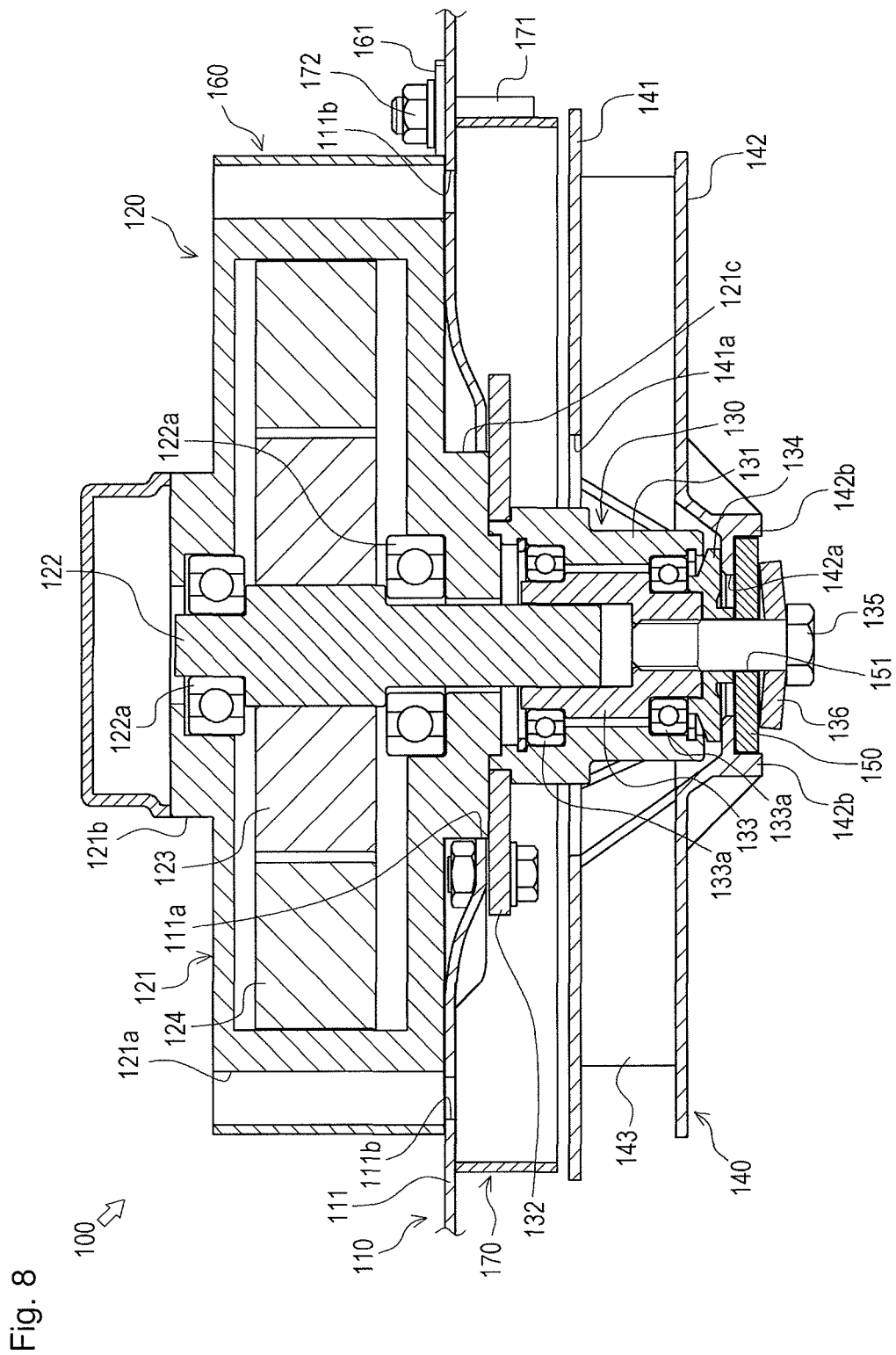
FIG. 8 is a cross-sectional view along a line A-A in FIG. 7.

The shaft 122 shown in FIGS. 5 and 8 outputs rotational drive power of the work motor 120. The shaft 122 is positioned in the center (on the axis line) of the housing 121 in a state where the axis line is oriented in the vertical direction. A bottom end of the shaft 122 is positioned so as to project downward from the bottom surface of the housing 121. The shaft 122 is supported so as to be capable of rotation by a top-bottom pair of bearings 122a provided in the interior of the housing 121.

The rotor 123 shown in FIG. 8 is a field magnet (or an armature) capable of rotating together with the shaft 122. The rotor 123 is positioned within the housing 121. The rotor 123 is fixated to a vertical direction middle portion of the shaft 122 and can rotate together with the shaft 122.

The stator 124 is an armature (or a field magnet) fixated within the housing 121. The stator 124 is positioned within the housing 121 so as to laterally surround the rotor 123.

The work motor 120 configured in this way is placed on the top surface 111 of the mower deck 110. The work motor 120 is positioned such that the axis line of the work motor 120 matches the center of the center hole 111a of the mower deck 110. In this case, the bottom portion 121c of the housing 121 is inserted through the center hole 111a of the mower deck 110. Accordingly, the bottom end of the bottom portion 121c is positioned in an interior of the mower deck 110 (lower than the top surface 111 of the mower deck 110). The bottom end of the shaft 122 of the work motor 120 projects toward the interior of the mower deck 110 via the center hole 111a. In such a work motor 120, electric current flows to and excites the stator 124 or the rotor 123, thereby enabling the shaft 122 to be rotated and rotational drive power to be obtained.

Figure 4:
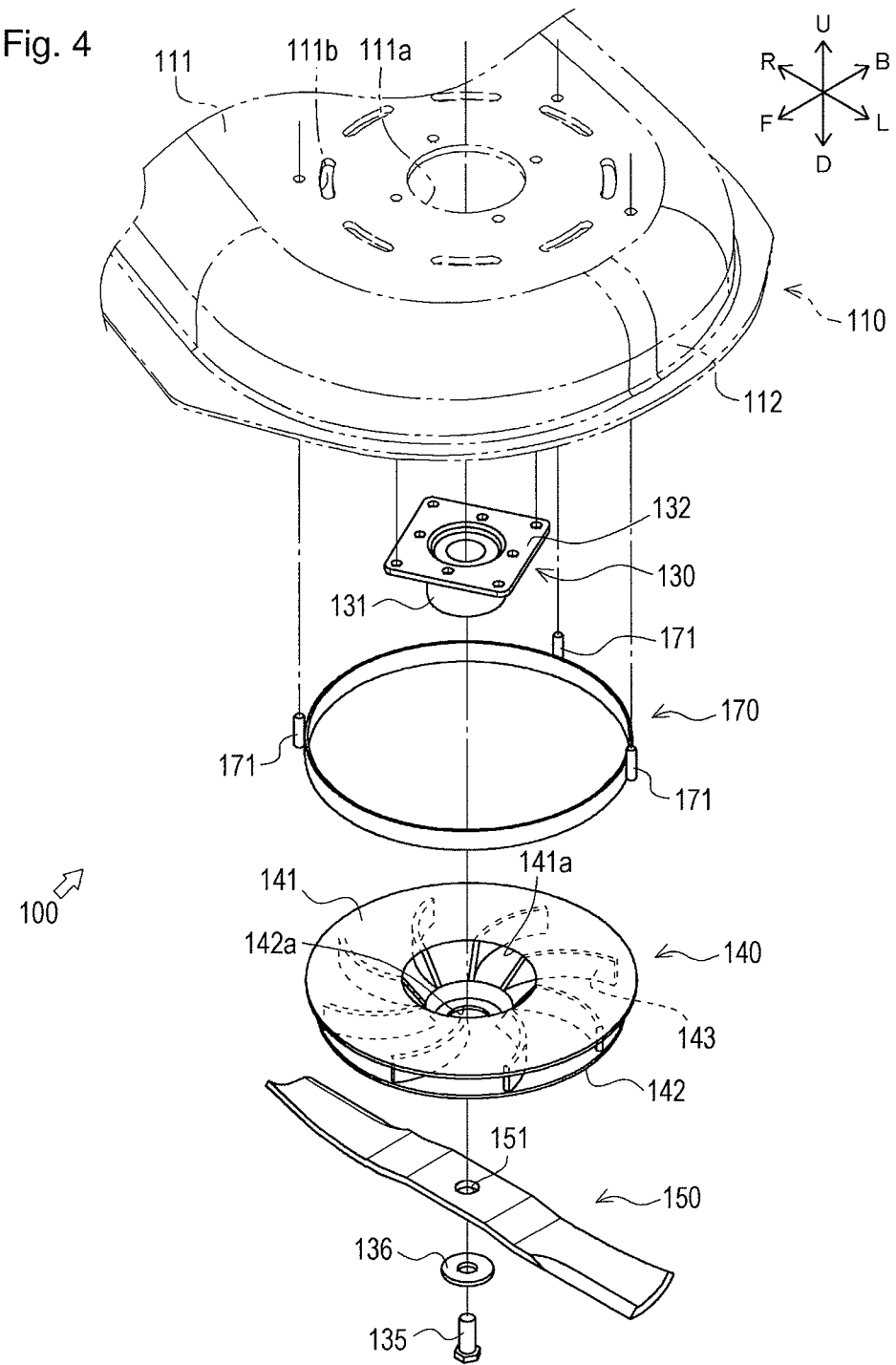
FIG. 4 is an overhead exploded perspective view of a bottom portion of the mower.
Figure 6:
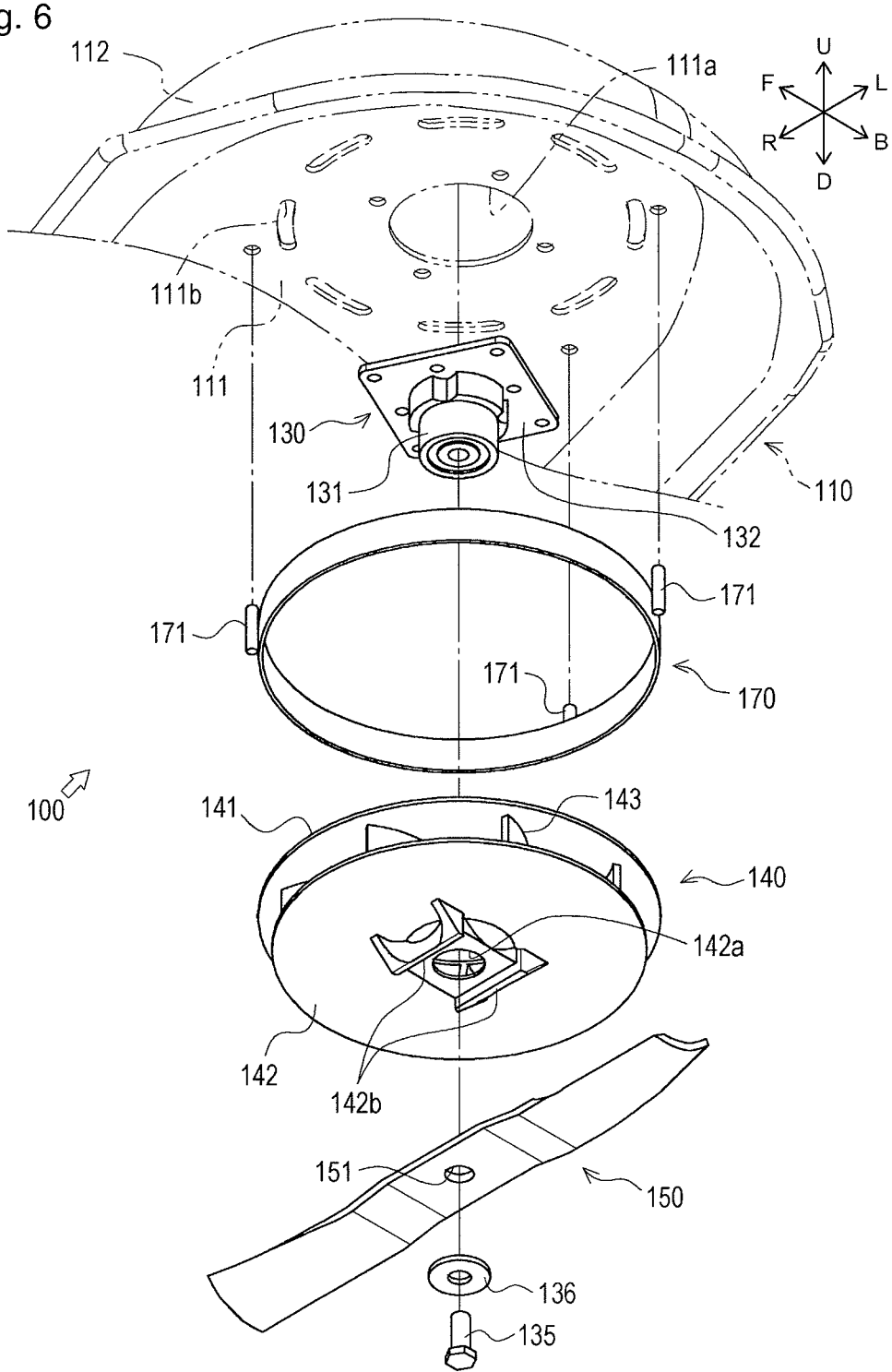
FIG. 6 is an underside exploded perspective view of the bottom portion of the mower.
Figure 7:
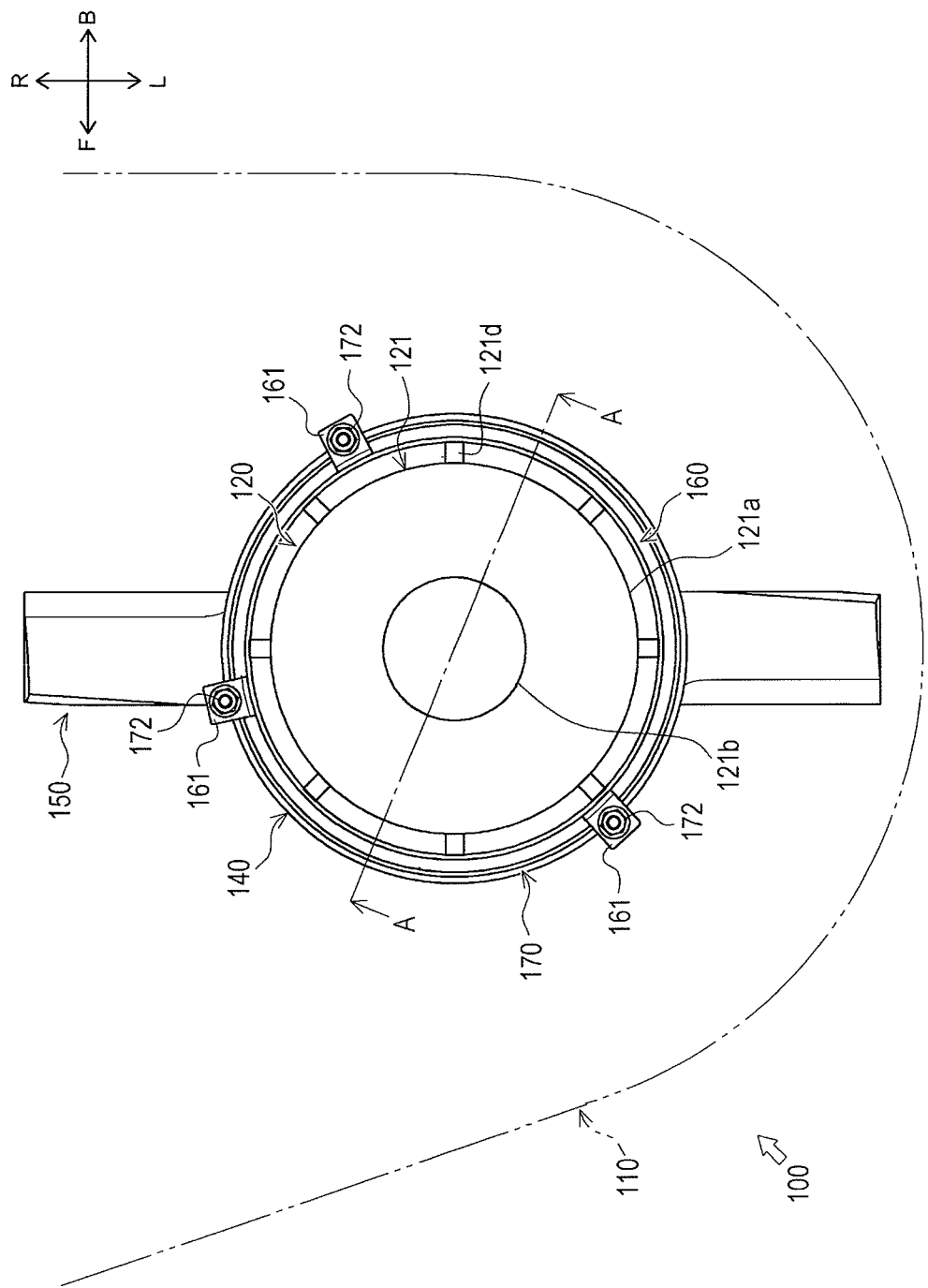
FIG. 7 is an enlarged plan view of the mower.

The spacer 130 shown in FIGS. 4, 6, and 8 transmits the rotational drive power being output from the shaft 122 of the work motor 120 even further downward than the shaft 122.

The spacer 130 includes primarily a housing 131, a flange 132, a shaft coupling 133, and a seal member 134.

The housing 131 forms a principal structure of the spacer 130. The housing 131 is formed in a substantially cylindrical shape having an axis line oriented in the vertical direction.

The flange 132 is a substantially rectangular plate-shaped portion. The flange 132 is positioned so as to be substantially horizontal. The flange 132 is fixed or connected to the top end of the housing 131.

The shaft coupling 133 transmits the rotational drive power from the shaft 122 of the work motor 120. The shaft coupling 133 is formed in a substantially cylindrical shape having an axis line oriented in the vertical direction. The shaft coupling 133 is positioned in the center (on the axis line) of the housing 131. The shaft coupling 133 is supported so as to be capable of rotation by a top-bottom pair of bearings 133a provided in the interior of the housing 131.

The seal member 134 seals the bottom end of the housing 131 as appropriate. By sealing the bottom end of the housing 131 with the seal member 134, foreign objects can be prevented from infiltrating the housing 131.

The spacer 130 configured in this way is placed in the interior of the mower deck 110. The spacer 130 is positioned such that the axis line of the spacer 130 (axis line of the shaft coupling 133) matches the center of the center hole 111a of the mower deck 110. In this state, the flange 132 of the spacer 130 is fixated to the top surface 111 of the mower deck 110 as appropriate using bolts or the like. In this case, the bottom end of the shaft 122 of the work motor 120 is coupled to the top end of the shaft coupling 133 of the spacer 130 such that the shaft 122 is not capable of relative rotation. Thereby, the shaft coupling 133 can be rotated together with the shaft 122.

The fan 140 (centrifugal fan) sends (circulates) air from an interior to the exterior. The fan 140 includes primarily a top plate 141, a bottom plate 142, and fan blades 143.

The top plate 141 is formed in substantially a circular plate shape. The top plate 141 is positioned so as to be substantially horizontal. A center hole 141a is formed on the top plate 141.

A center hole 141a is formed so as to run through the top plate 141 vertically. The center hole 141a is formed to have a circular shape in a plan view. The center hole 141a is formed at a center of the top plate 141.

The bottom plate 142 is formed in substantially a circular plate shape. A diameter of the bottom plate 142 is formed so as to be smaller than a diameter of the top plate 141. The bottom plate 142 is positioned so as to be parallel with the top plate 141 (substantially horizontal). The bottom plate 142 is positioned below the top plate 141 in a state separated from the top plate 141 by a predetermined distance. The bottom plate 142 is positioned such that an axis line of the bottom plate 142 matches the axis line of the top plate 141. A center hole 142a and ribs 142b are formed on the bottom plate 142.

The center hole 142a is formed so as to run through the bottom plate 142 vertically. The center hole 142a is formed to have a circular shape in a plan view. The center hole 142a is formed at a center of the bottom plate 142. A diameter of the center hole 142a of the bottom plate 142 is formed so as to be smaller than a diameter of the center hole 141a of the top plate 141.

The ribs 142b are formed so as to project downward from the bottom surface of the bottom plate 142. Two of the ribs 142b are provided so as to have the center hole 142a therebetween in a bottom view. The two ribs 142b are formed so as to extend parallel to each other in a bottom view.

The fan blades 143 displace air (generate airflow) between the top plate 141 and the bottom plate 142. The fan blades 143 are formed by bending a substantially rectangular plate-shaped member as appropriate. The fan blades 143 are fixated to the top plate 141 and the bottom plate 142 so as to couple the top plate 141 and the bottom plate 142. A plurality of the fan blades 143 (eight in the present embodiment) are provided around a periphery of the axis lines of the top plate 141 and the bottom plate 142 (see FIG. 4).

The fan 140 configured in this way is placed in the interior of the mower deck 110. The fan 140 is positioned such that an axis line of the fan 140 matches the axis line of the spacer 130. In this state, the fan 140 is coupled to the spacer 130 (shaft coupling 133) from below. Thereby, the fan 140 can be rotated together with the shaft coupling 133. In this case, the bottom portion of the housing 131 of the spacer 130 is inserted through the center hole 141a of the top plate 141 of the fan 140. In addition, the bottom end of the spacer 130 (the seal member 134) abuts the bottom plate 142 of the fan 140.

The rotary blade 150 cuts grass due to being rotationally driven. The rotary blade 150 is formed in substantially a rectangular plate shape. The rotary blade 150 is bent as appropriate and, when rotated, can send (circulate) air upward from below. A through-hole 151 running through the rotary blade 150 vertically is provided at the center of the rotary blade 150.

The rotary blade 150 configured in this way is placed in the interior of the mower deck 110. The rotary blade 150 is fitted, from below the fan 140, between the two ribs 142b formed on the fan 140. In this state, a bolt 135 is fastened to the spacer 130 (shaft coupling 133) via a metal washer 136 from below the rotary blade 150. In this way, the drive power from the work motor 120 is transmitted to the fan 140 and the rotary blade 150 via the shaft coupling 133. The fan 140 and the rotary blade 150 rotate integrally or together.

The first shroud 160 shown in FIGS. 3, 5, 7, and 8 forms a path through which air flows (an air flow passage). The first shroud 160 is formed in a substantially cylindrical shape having an axis line oriented in the vertical direction. An inner diameter of the first shroud 160 is formed so as to be larger than the diameter of the housing 121 of the work motor 120. The inner diameter of the first shroud 160 is also formed so as to be larger than the diameter of the circumference formed by the communicating holes 111b of the mower deck 110. A vertical direction breadth (height) of the first shroud 160 is formed so as to be substantially identical to the vertical direction-breadth of the housing 121 of the work motor 120. A fixation portion(s) 161 is formed on the first shroud 160.

The fixation portion(s) 161 is formed in substantially a rectangular plate shape. A plurality of the fixation portions 161 (three in the present embodiment) are formed on a bottom edge of the first shroud 160. The fixation portions 161 are formed so as to extend outward from the bottom edge of the first shroud 160. The fixation portions 161 are formed so as to be substantially horizontal.

The first shroud 160 configured in this way is placed on the top surface 111 such that the fixation portions 161 make contact with the top surface 111 of the mower deck 110. The first shroud 160 is positioned such that an axis line of the first shroud 160 matches the axis line of the work motor 120. Thereby, the first shroud 160 is positioned in a state leaving a predetermined gap open between the first shroud 160 and the side surface of the work motor 120. Specifically, a substantially cylindrical space is formed between the first shroud 160 and the work motor 120. In this case, an outer edge portion of the fins 121d of the work motor 120 is positioned so as to touch an inner surface of the first shroud 160.

The second shroud 170 shown in FIGS. 4, 6, 7, and 8 forms an air flow passage. The second shroud 170 is formed in a substantially cylindrical shape having an axis line oriented in the vertical direction. An inner diameter of the second shroud 170 is formed so as to be larger than the inner diameter of the first shroud 160. An outer diameter of the second shroud 170 is formed so as to be substantially identical to the diameter of the top plate 141 of the fan 140. A vertical direction breadth of the second shroud 170 is formed so as to be substantially identical to a distance between the top surface 111 of the mower deck 110 and the top plate 141 of the fan 140. A fixation portion(s) 171 is provided on the second shroud 170.

The fixation portion(s) 171 is formed in a substantially cylindrical shape having an axis line oriented in the vertical direction. A plurality of the fixation portions 171 (three in the present embodiment) are formed on a top edge of an outer surface of the second shroud 170. The fixation portions 171 are each provided in positions overlapping with the fixation portions 161 of the first shroud 160 in a plan view. The fixation portions 171 are positioned so as to project upward from the top edge of the second shroud 170. A male threaded portion (not pictured) is formed on a top end of the fixation portions 171.

The second shroud 170 configured in this way is placed in the interior of the mower deck 110. The second shroud 170 is positioned such that an axis line of the second shroud 170 matches the axis line of the spacer 130. In this state, the second shroud 170 abuts the top surface 111 of the mower deck 110 from below. In this case, the top ends of the fixation portions 171 of the second shroud 170 are inserted through the top surface 111 of the mower deck 110 and through the respective fixation portions 161 of the first shroud 160. A nut 172 is fastened onto the fixation portions 171 from above the fixation portions 161 of the first shroud 160. Thereby, the first shroud 160 and the second shroud 170 are fixated to the mower deck 110. Moreover, after the second shroud 170 is fixated to the mower deck 110, the fan 140 and the rotary blade 150 are fixated to the spacer 130.

In the mower 100 configured in this way, an air flow passage is formed that connects the interior of the mower deck 110 with the exterior. Hereafter, a manner in which the air flows through the air flow passage is described.

When the work motor 120 is driven, the fan 140 and rotary blade 150 are rotationally driven by the rotational drive power of the work motor 120. Due to the fan 140 and the rotary blade 150 rotating, air flows from the exterior of the mower deck 110 to the interior.

Figure 9:
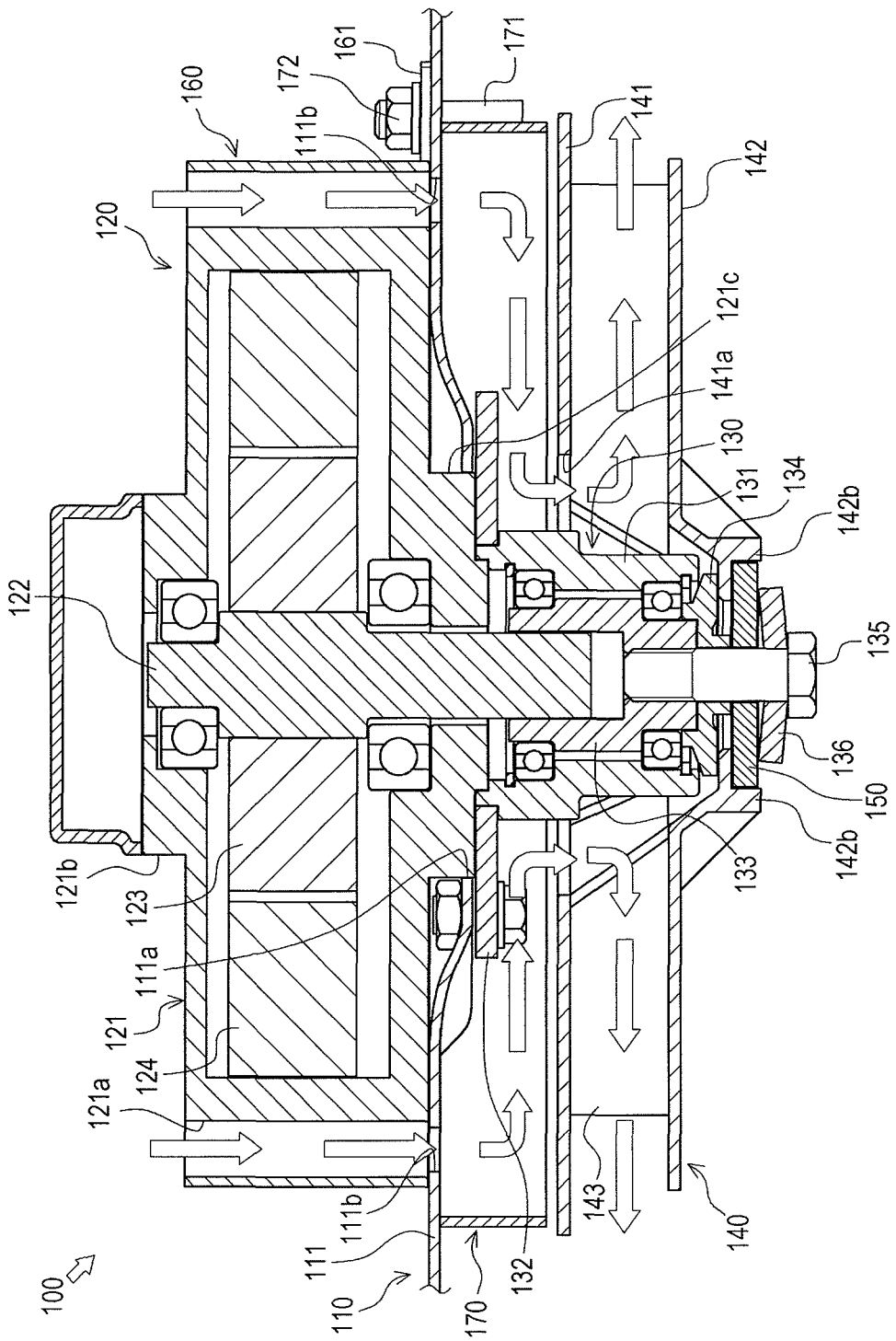
FIG. 9 is a cross-sectional view along the line A-A illustrating how air flows.
Figure 10:
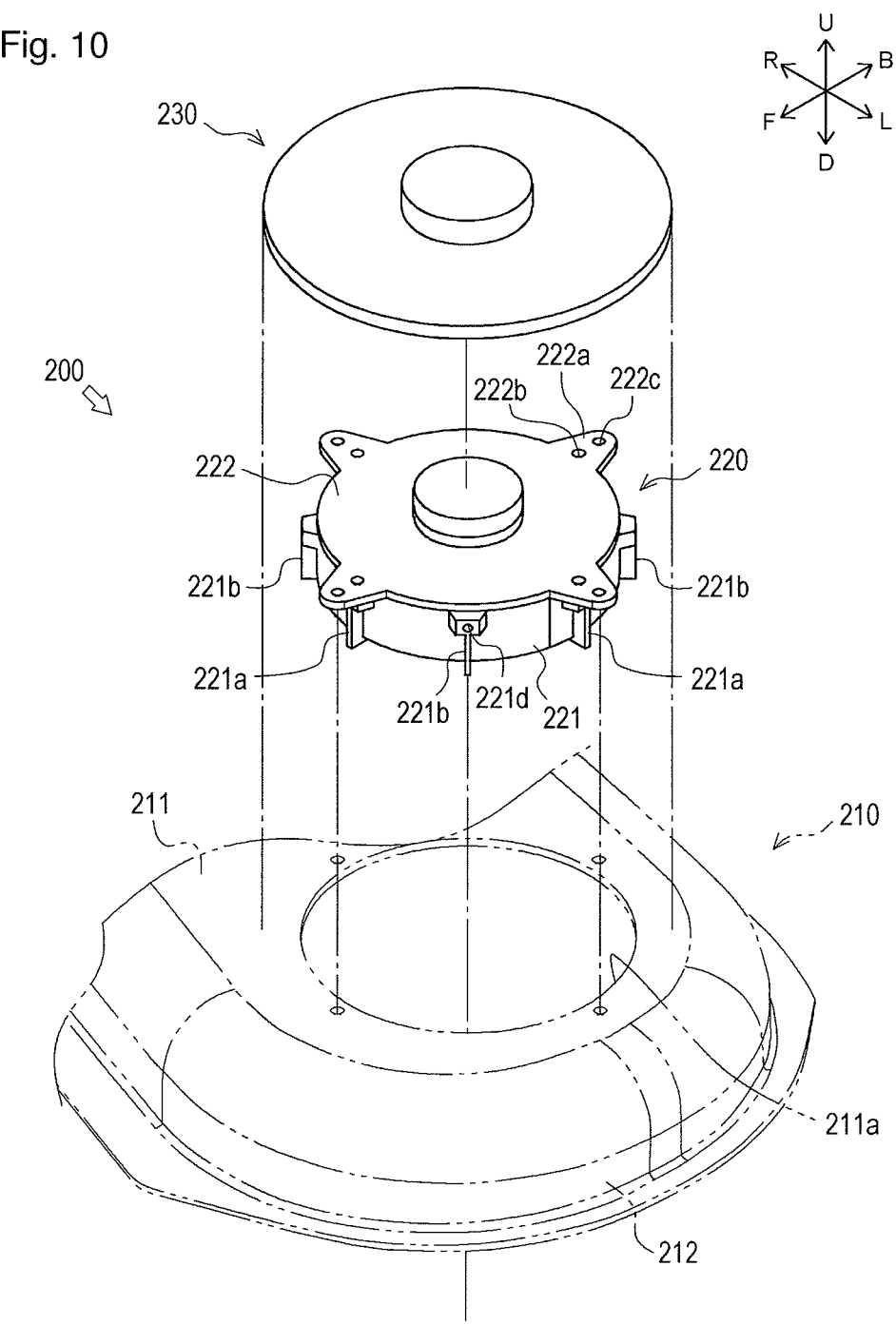
FIG. 10 is an overhead exploded perspective view of a top portion of a mower according to a second embodiment.
Figure 11:
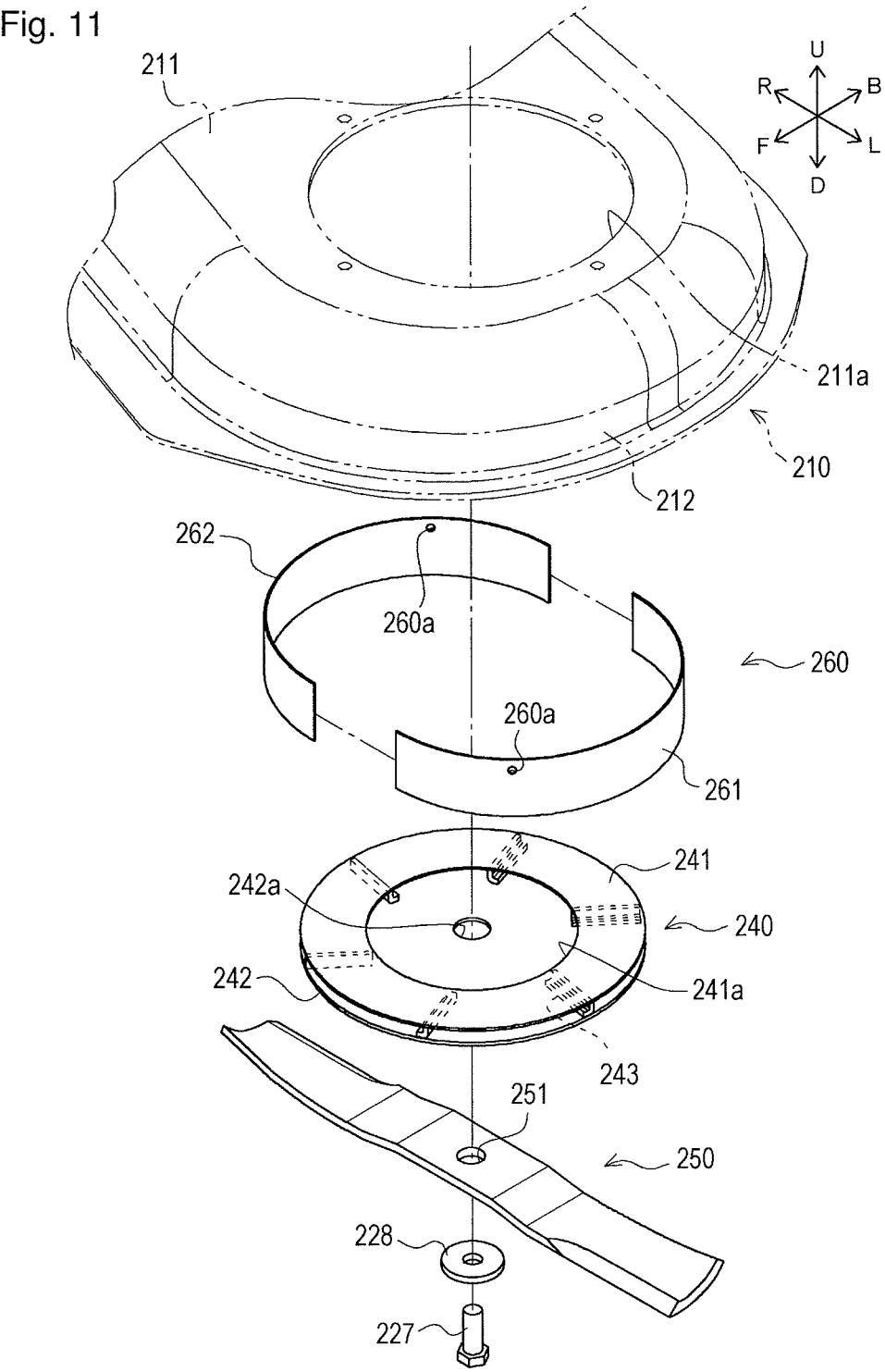
FIG. 11 is an overhead exploded perspective view of a bottom portion of the mower.
Figure 12:
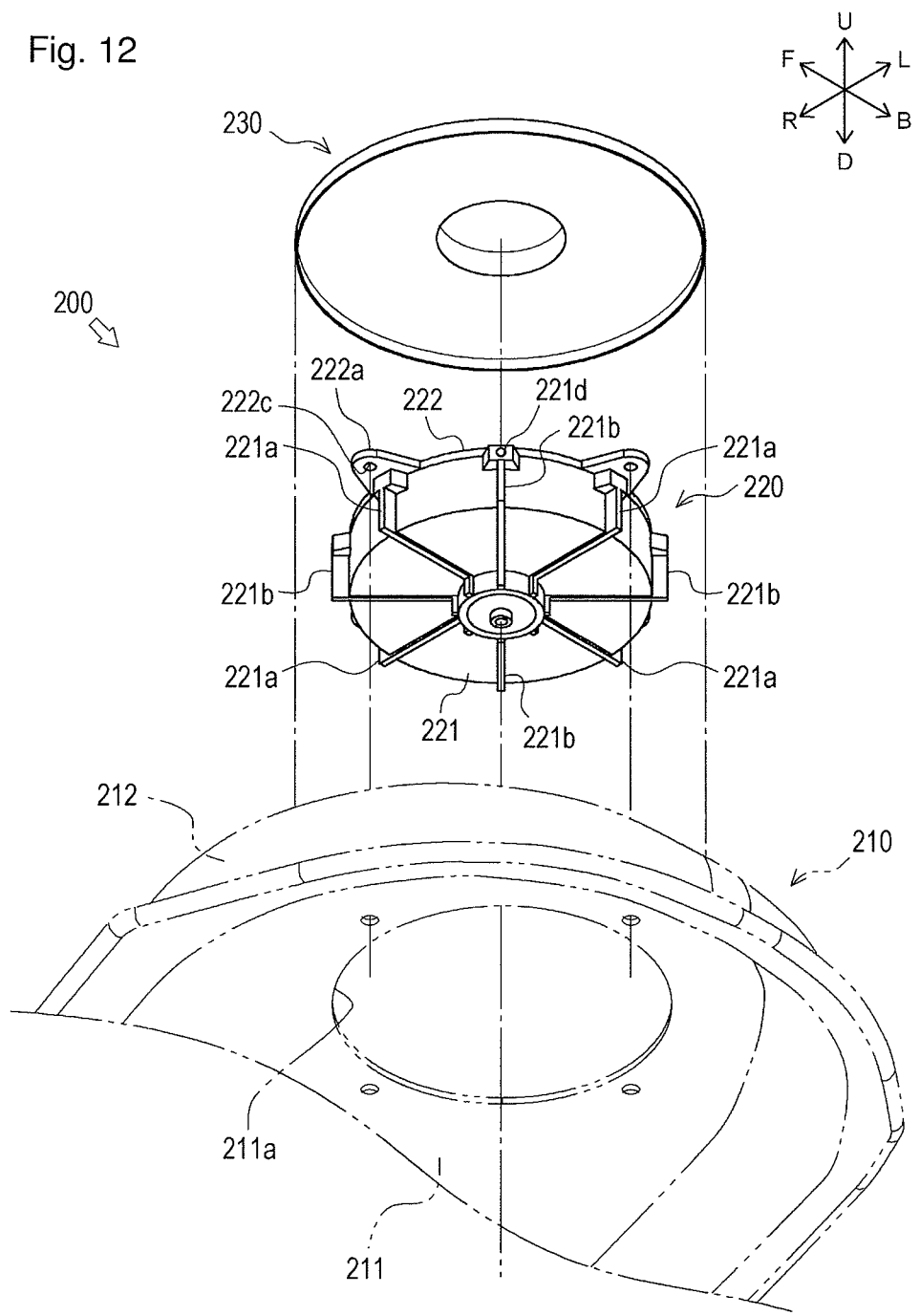
FIG. 12 is an underside exploded perspective view of the top portion of the mower.
Figure 13:
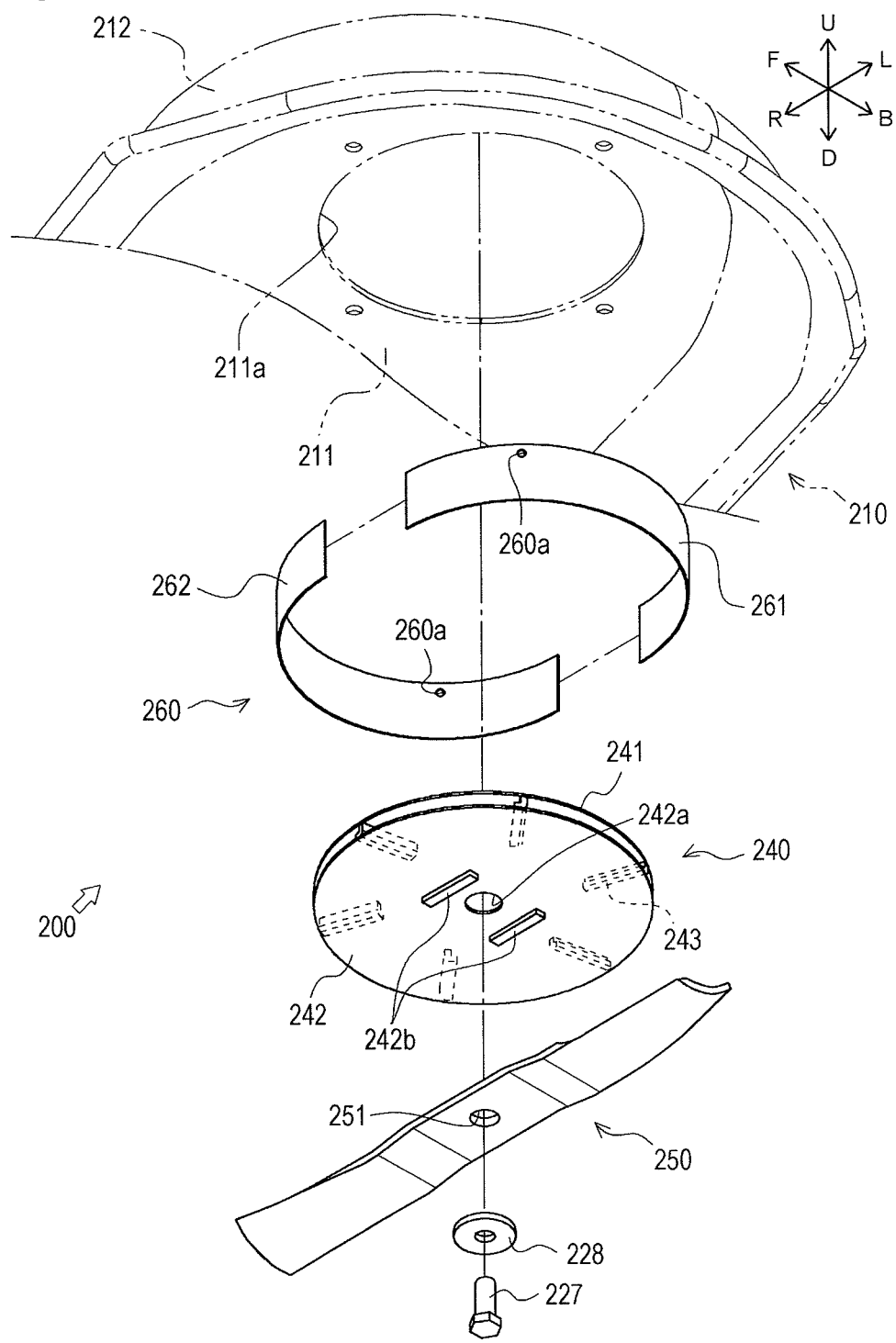
FIG. 13 is an underside exploded perspective view of the bottom portion of the mower.
Figure 14:
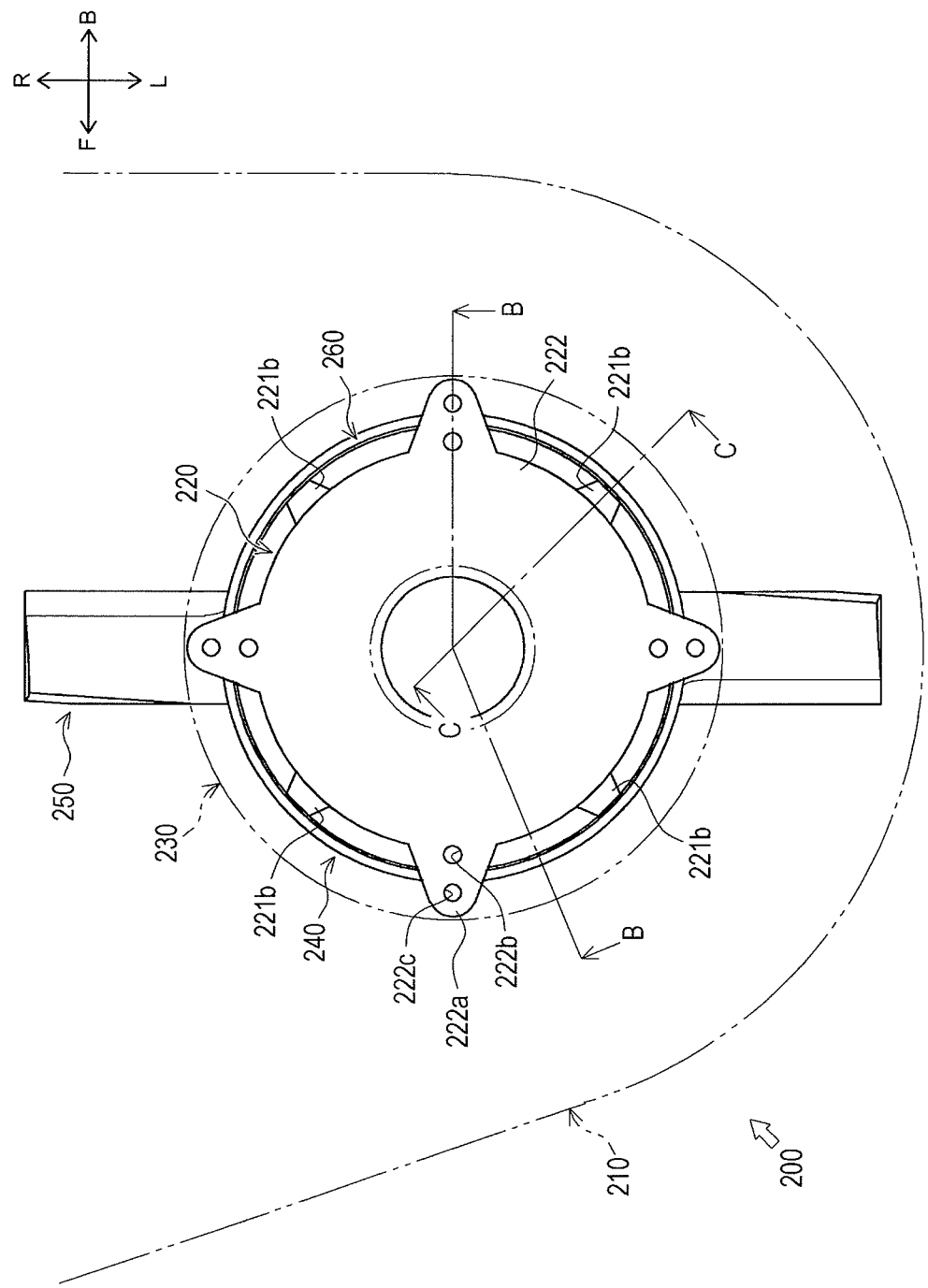
FIG. 14 is an enlarged plan view of the mower.

Specifically, as shown in FIG. 9, the air outside the mower deck 110 (above the mower deck 110) flows from above downward through the space between the first shroud 160 and the side surface of the housing 121 of the work motor 120. In this case, the work motor 120 (side surface of the housing 121) is cooled by the air flowing alongside the work motor 120. In addition, the fins 121d (see FIG. 7) are formed on the side surface of the housing 121, and therefore the surface area of the housing 121 is increased as compared to a case where the fins 121d are not formed. Therefore, the housing 121 can be cooled effectively by the flowing air. The fins 121d are also in contact with the first shroud 160. Therefore, heat of the work motor 120 can be dissipated to the exterior of the mower deck 110 via the fins 121d and the first shroud 160, and the work motor 120 can be cooled effectively.

The air flowing downward through the space between the side surface of the housing 121 and the first shroud 160 flows into the interior of the mower deck 110 via the communicating holes 111b of the mower deck 110. The air flows toward the interior (in a direction approaching the axis line of the work motor 120) through the space demarcated by the top surface 111 of the mower deck 110, the second shroud 170, and the top plate 141 of the fan 140. In this case, the air flowing alongside the mower deck 110 cools the work motor 120 (bottom surface of the housing 121) via the top surface 111 of the mower deck 110. In particular, in the present embodiment, a portion of the work motor 120 (bottom end of the bottom portion 121c of the housing 121) is positioned in the interior of the mower deck 110. Accordingly, the work motor 120 can be cooled effectively by the airflow in the interior of the mower deck 110.

The air flowing toward the interior through the space demarcated by the top surface 111, the second shroud 170, and the top plate 141 flows into the space between the top plate 141 and the bottom plate 142 via the center hole 141a of the top plate 141. The air is sent outward by the fan blades 143 of the rotating fan 140.

In this way, in the mower 100, the air flow passage is formed along the side surface and bottom surface of the work motor 120. Therefore, the work motor 120 can be cooled effectively. In addition, the work motor 120 can be cooled using air from the exterior of the mower deck 110, which contains fewer foreign bodies (mowed grass (turf), dust particles, and so on) as compared to the air in the interior of the mower deck 110. Therefore, foreign bodies are unlikely to get stuck in the air flow passage, and a reduction in cooling performance can be inhibited.

As noted above, the mower 100 according to the present embodiment includes the rotary blade 150 cutting grass due to being rotationally driven; the work motor 120 (motor) rotationally driving the rotary blade 150; the mower deck 110 housing the rotary blade 150 in the interior thereof; and the first shroud 160 (guide member) forming the air flow passage along the work motor 120, the air flow passage connecting the interior and exterior of the mower deck 110. Due to this configuration, the work motor 120 can be cooled effectively by air flowing from the exterior of the mower deck 110 to the interior. Accordingly, a reduction in output of the work motor 120 can be inhibited.

In addition, the first shroud 160 is positioned so as to face the side surface of the work motor 120. Due to this configuration, the side surface of the work motor 120 can be cooled effectively.

The work motor 120 includes at least one fin 121d, which is formed so as to extend outward from the side surface, and such that the outer edge portion touches the first shroud 160. Due to this configuration, the surface area of the work motor 120 can be increased, and the work motor 120 can be cooled effectively. In addition, heat can be dissipated via the fin 121d and the first shroud 160, and the work motor 120 can be cooled more effectively. Also, due to the fin 121d touching the first shroud 160, deformation of or damage to the first shroud 160 can be inhibited.

In addition, the mower 100 further includes the fan 140, which sends air from the exterior to the interior of the mower deck 110. Due to this configuration, an amount of airflow can be increased, and the work motor 120 can be cooled more effectively.

Moreover, the fan 140 is driven by the work motor 120. Due to this configuration, there is no need to provide a separate drive source driving the fan 140.

The mower 100 according to the present embodiment is an embodiment of a mower according to the present invention, and various concrete configurations can be altered as desired within the technical scope of the present invention.

A number of work motors 120 provided to the mower 100 is not particularly limited. In addition, a configuration is also possible in which a plurality of rotary blades 150 are rotationally driven by a single work motor 120.

A number of fins 121d is not particularly limited. By increasing the number of fins 121d, the surface area of the work motor 120 (housing 121) can be increased.

A configuration is also possible in which the fan 140 is not provided to the mower 100. In this case, air can be caused to flow accompanying the rotation of the rotary blade 150.

Furthermore, the fan 140 is not limited to being positioned below the work motor 120, but can be placed in any desired position. For example, a configuration is possible in which the fan 240 is positioned above the work motor 120 and air is sent downward (toward the interior of the mower deck 110).

Next, with reference to FIGS. 10 to 17, a configuration of a mower 200 (and in particular, a configuration related to a work motor 220 described hereafter) according to a second embodiment of the present invention is described.

The mower 200 is a work apparatus that cuts grass growing below the mower 200 such that the grass is a predetermined length (height). The mower 200 includes primarily a mower deck 210, the work motor 220, a motor cover 230, a fan 240, a rotary blade 250, and a shroud 260.

For ease of description in the following, only a configuration in a vicinity of a left end portion of the mower 200 is described. More specifically, the mower 200 according to the present embodiment includes a plurality of work motors 220; however, in the following, only the configuration of the work motor 220 in the left-most position and an area around this work motor 220 are described.

The mower deck 210 shown in FIGS. 10 to 15 forms a principal structure of the mower 200. The mower deck 210 includes primarily a top surface 211 and a side surface 212.

The top surface 211 is a plate-shaped portion formed so as to be substantially horizontal. The top surface 211 is formed such that a length direction thereof is oriented along the left-right direction. The side surface 212 is a portion formed so as to extend downward from an outer peripheral end of the top surface 211. The top surface 211 and the side surface 212 are integrally formed. A connection portion between the top surface 211 and the side surface 212 is formed so as to create a smoothly curved surface. A space covered from above and laterally is formed in an interior of the mower deck 210 by the top surface 211 and the side surface 212. Primarily, a center hole 211a is formed on the top surface 211.

The center hole 211a is formed so as to run through the top surface 211 vertically. The center hole 211a is formed to have a round shape in a plan view.

The work motor 220 shown in FIGS. 10, 12, 14, 15, and 16 rotationally drives the rotary blade 250 (described below) using electric power. The work motor 220 includes primarily a lower housing 221, an upper housing 222, a shaft 223, a rotor 224, a stator 225, and a seal member 226.

The lower housing 221 forms a principal structure of the work motor 220. The lower housing 221 includes a side surface having a substantially cylindrical shape with an axis line oriented in the vertical direction, and a bottom surface having a substantially circular plate shape covering a bottom portion of the side surface. A diameter of the lower housing 221 is formed so as to be smaller than a diameter of the center hole 211a of the mower deck 210. A through-hole having a bolt 227 inserted therein (described hereafter) is formed on a bottom end portion (center of the bottom surface) of the lower housing 221. A first fin 221a and a second fin 221b are formed on the lower housing 221.

The first fin 221a and the second fin 221b are formed in substantially a rectangular plate shape, and are formed so as to span from a top edge to a bottom edge of the lower housing 221. A plurality of the first fins 221a and the second fins 221b (four each in the present embodiment) are formed on the side surface of the lower housing 221. The first fins 221a and the second fins 221b are provided so as to alternate in a circumference direction of the side surface of the lower housing 221. The first fins 221a and the second fins 221b are formed so as to extend radially outward from the side surface of the lower housing 221. A length from an inner edge to an outer edge of the first fins 221a and the second fins 221b is formed to be identical for all fins. A thickness of the top end portion of the first fins 221a and the second fins 221b is formed so as to be thicker than other portions (the bottom portion). A female threaded portion 221c is formed on the top end (top surface) of the first fins 221a (see FIG. 15). A female threaded portion 221d is formed near the top end of the outer surface of the second fins 221b (see FIG. 16). A surface area of the lower housing 221 can be increased by the formation of the first fins 221a and the second fins 221b.

The upper housing 222 covers the top portion of the lower housing 221. The upper housing 222 is formed in substantially a circular plate shape. A diameter of the upper housing 222 is formed so as to be substantially identical to the diameter of the lower housing 221. A projection 222a is formed on the upper housing 222.

The projection 222a is a portion formed so as to project outward from an outer peripheral end of the upper housing 222. A plurality of the projections 222a (four in the present embodiment) are formed on the upper housing 222. The projections 222a are formed so as to be positioned at mutually equal intervals on an outer periphery of the upper housing 222. A first through-hole 222b and a second through-hole 222c are formed on the projections 222a.

The first through-hole 222b and the second through-hole 222c are formed so as to run through the upper housing 222 (projections 222a) vertically. The first through-hole 222b is formed near an inner edge portion of the projections 222a. The second through-hole 222c is formed near an outer edge portion of the projections 222a.

The upper housing 222 is placed over the lower housing 221 so as to cover the top portion of the lower housing 221. In this case, the first through-hole 222b of the upper housing 222 and the female threaded portion 221c of the lower housing 221 are opposite each other. In this state, by fastening a bolt (not shown in the drawings) in the female threaded portion 221c from above via the first through-hole 222b, the upper housing 222 is fixated to the lower housing 221. In this way, in an interior of the casing member (housing) formed by the lower housing 221 and the upper housing 222, a space is formed where various components are placed.

Figure 15:
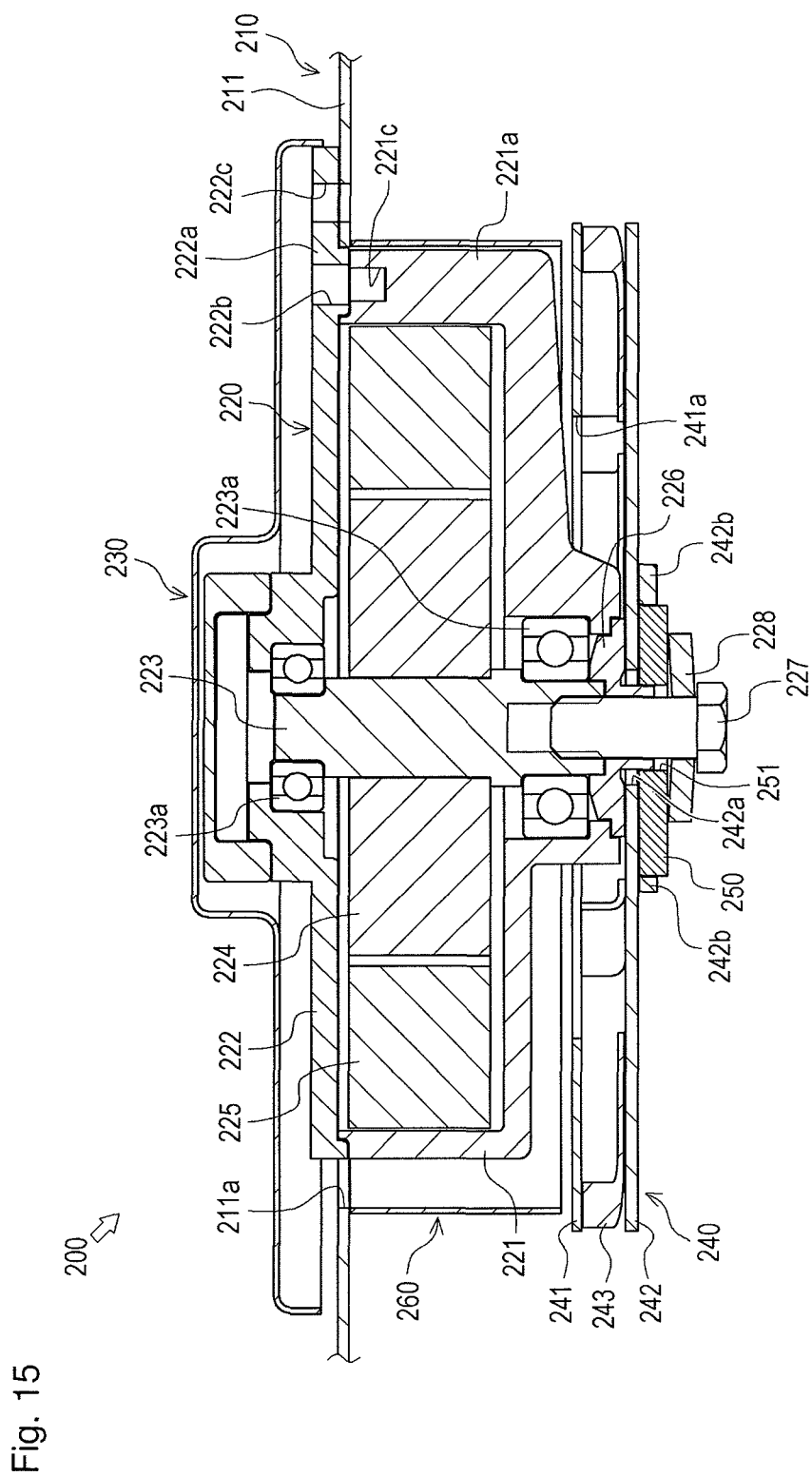
FIG. 15 is a cross-sectional view along a line B-B in FIG. 14.
Figure 16:
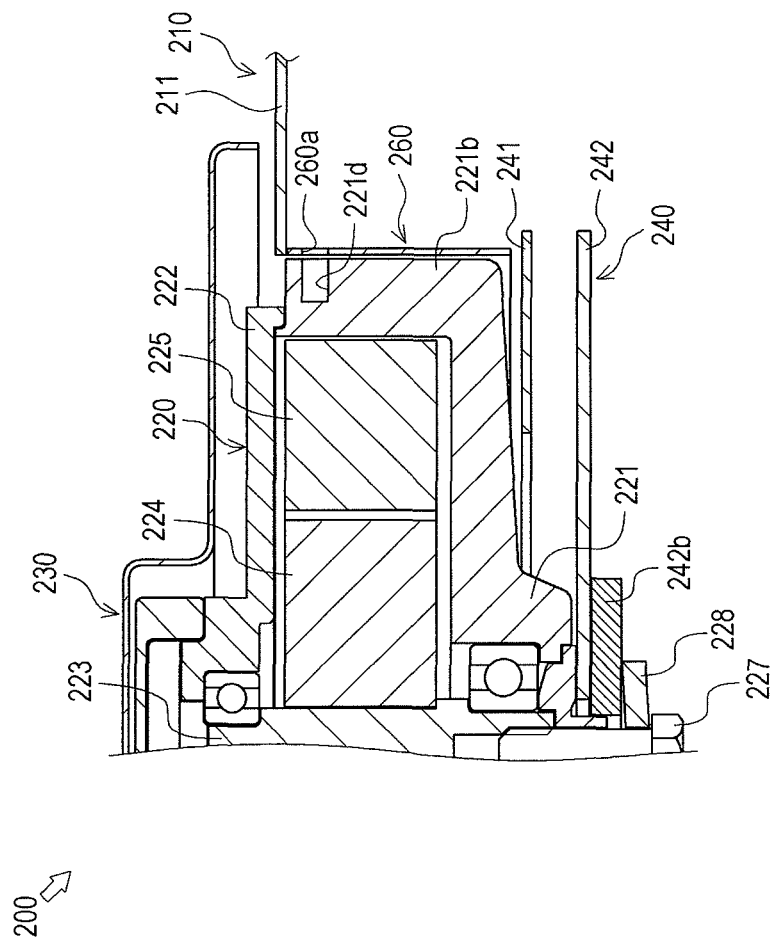
FIG. 16 is a cross-sectional view along a line C-C in FIG. 14.

The shaft 223 shown in FIG. 15 outputs the rotational drive power of the work motor 220. The shaft 223 is positioned in the center (on the axis line) of the lower housing 221 and the upper housing 222 in a state where the axis line is oriented in the vertical direction. The shaft 223 is supported so as to be capable of rotation by a top-bottom pair of bearings 223a provided in the interior of the lower housing 221 and the upper housing 222.

The rotor 224 is a field magnet (or an armature) capable of rotating together with the shaft 223. The rotor 224 is positioned within the lower housing 221 and the upper housing 222. The rotor 224 is fixated to a vertical direction middle portion of the shaft 223 and can rotate together with the shaft 223.

The stator 225 is an armature (or a field magnet) fixated within the lower housing 221 and the upper housing 222. The stator 225 is positioned within the lower housing 221 and the upper housing 222 so as to laterally encircle the rotor 224.

The seal member 226 seals the through-holes on the bottom end of the lower housing 221 as appropriate. By sealing the through-holes on the bottom end of the lower housing 221 with the seal member 226, foreign objects can be prevented from infiltrating the lower housing 221.

The work motor 220 configured in this way is inserted into the center hole 211a from above the mower deck 210. The work motor 220 is positioned such that the axis line of the work motor 220 matches the center of the center hole 211a. The projections 222a of the upper housing 222 are placed on the top surface 211 of the mower deck 210. In this state, a bolt or the like (not shown in the drawings) is fastened to the second through-hole 222c of the upper housing 222, and the upper housing 222 is fixated to the top surface 211 of the mower deck 210. In this way, substantially the entire work motor 220 (specifically, the lower housing 221, the bottom portion of the shaft 223, the rotor 224, the stator 225, and the like) is placed in the interior of the mower deck 210 (below the top surface 211 of the mower deck 210). Thereby, the work motor 220 can be prevented from protruding upward from the upper portion of the mower deck 210. Accordingly, the work motor 220 can be prevented from interfering with other members, and efficient use can be made of the space above the mower deck 210 (to position other members, for example). In such a work motor 220, electric current flows to and excites the rotor 224 or the stator 225, thereby enabling the shaft 223 to be rotated and rotational drive power to be obtained.

The motor cover 230 shown in FIGS. 10, 12, 14, and 15 covers the top portion of the work motor 220. The motor cover 230 is formed by bending an outer peripheral end portion of a substantially circular plate-shaped member, as seen in a plan view, downward. A diameter of the motor cover 230 is formed so as to be greater than a length from an outer end portion of one of the projections 222a of the upper housing 222 to an outer end portion of another of the projections 222a formed at a position opposite the first projection 222a.

The motor cover 230 configured in this way is fixated onto the work motor 220 (upper housing 222) from above the work motor 220. In this case, an appropriate gap is formed between the outer peripheral end portion of the motor cover 230 and the top surface 211 of the mower deck 210. The work motor 220 is covered from above by the motor cover 230.

The fan 240 shown in FIGS. 11, 13, 14, and 15 is a centrifugal fan sending (circulating) air from the interior to the exterior. The fan 240 includes primarily a top plate 241, a bottom plate 242, and fan blades 243.

The top plate 241 is formed in substantially a circular plate shape. The top plate 241 is positioned so as to be substantially horizontal. A center hole 241a is formed on the top plate 241.

The center hole 241a is formed so as to run through the top plate 241 vertically. The center hole 241a is formed to have a circular shape in a plan view. The center hole 241a is formed at the center of the top plate 241.

The bottom plate 242 is formed in substantially a circular plate shape. A diameter of the bottom plate 242 is formed so as to be substantially identical to a diameter of the top plate 241. The bottom plate 242 is positioned so as to be parallel with the top plate 241 (substantially horizontal). The bottom plate 242 is positioned below the top plate 241 in a state separated from the top plate 241 by a predetermined distance. The bottom plate 242 is positioned such that an axis line of the bottom plate 242 matches the axis line of the top plate 241. A center hole 242a and ribs 242b are formed on the bottom plate 242.

The center hole 242a is formed so as to run through the bottom plate 242 vertically. The center hole 242a is formed to have a circular shape in a plan view. The center hole 242a is formed at the center of the bottom plate 242. A diameter of the center hole 242a of the bottom plate 242 is formed so as to be smaller than the diameter of the center hole 241a of the top plate 241.

The ribs 242b are formed so as to project downward from the bottom surface of the bottom plate 242. Two of the ribs 242b are provided so as to have the center hole 242a therebetween in a bottom view. The two ribs 242b are formed so as to extend parallel to each other in a bottom view.

The fan blades 243 displace air (generate airflow) between the top plate 241 and the bottom plate 242. The fan blades 243 are formed by bending a substantially rectangular plate-shaped member as appropriate. The fan blades 243 are fixated to the top plate 241 and the bottom plate 242 so as to couple the top plate 241 and the bottom plate 242. A plurality of the fan blades 243 (eight in the present embodiment) are provided around a periphery of the axis lines of the top plate 241 and the bottom plate 242.

The fan 240 configured in this way is placed in the interior of the mower deck 210. The fan 240 is positioned such that an axis line of the fan 240 matches the axis line of the work motor 220. In this state, the fan 240 is coupled to the work motor 220 (shaft 223) from below the work motor 220. Thereby, the fan 240 can be rotated together with the shaft 223. In this case, the bottom end portion of the work motor 220 is inserted through the center hole 241a of the top plate 241 of the fan 240. In addition, the bottom end of the work motor 220 (the seal member 226) abuts the bottom plate 242 of the fan 240.

The rotary blade 250 cuts grass due to being rotationally driven. The rotary blade 250 is formed in substantially a rectangular plate shape. The rotary blade 250 is bent as appropriate and, when rotated, can send (circulate) air upward from below. A through-hole 251 running through the rotary blade 250 vertically is provided at the center of the rotary blade 250.

The rotary blade 250 configured in this way is placed in the interior of the mower deck 210. The rotary blade 250 is fitted, from below the fan 240, between the two ribs 242b formed on the fan 240. In this state, the bolt 227 is fastened to the work motor 220 (shaft 223) via a metal washer 228 from below the rotary blade 250. In this way, the drive power from the work motor 220 is transmitted to the fan 240 and the rotary blade 250. The fan 240 and the rotary blade 250 integrally rotate.

The shroud 260 shown in FIGS. 11, 13, 14, 15, and 16 forms an air flow passage. The shroud 260 is formed in a substantially cylindrical shape having an axis line oriented in the vertical direction. The shroud 260 is formed by assembling a first shroud section 261 and a second shroud section 262, which are formed in a semicircular shape in a plan view. An inner diameter of the shroud 260 is formed so as to be substantially identical to the diameter of the center hole 211a of the mower deck 210. The inner diameter of the shroud 260 is formed so as to be smaller than the diameter of the top plate 241 of the fan 240. A vertical direction breadth (height) of the shroud 260 is formed so as to be smaller than the vertical direction breadth of the lower housing 221 of the work motor 220. A plurality of through-holes 260a running through the shroud 260 are formed near a top end portion of the shroud 260 (first shroud 261 and second shroud 262).

The shroud 260 configured in this way is placed in the interior of the mower deck 210. The shroud 260 is positioned such that an axis line of the shroud 260 matches the axis line of the work motor 220. In this state, the shroud 260 abuts the top surface 211 of the mower deck 210 from below. In this case, a bolt (not shown in the drawings) is fastened to the female threaded portion 221d of the lower housing 221 (see FIG. 16) via the through-holes 260a of the shroud 260. Accordingly, the shroud 260 is fixated to the lower housing 221 in a state where the first fins 221a and the second fins 221b of the lower housing 221 touch the shroud 260.

In the mower 200 configured in this way, an air flow passage is formed that connects the interior of the mower deck 210 with the exterior. Hereafter, a manner in which the air flows through the air flow passage is described.

When the work motor 220 is driven, the fan 240 and rotary blade 250 are rotationally driven by the rotational drive power of the work motor 220. Due to the fan 240 and the rotary blade 250 rotating, air flows from the exterior of the mower deck 210 to the interior.

Figure 17:
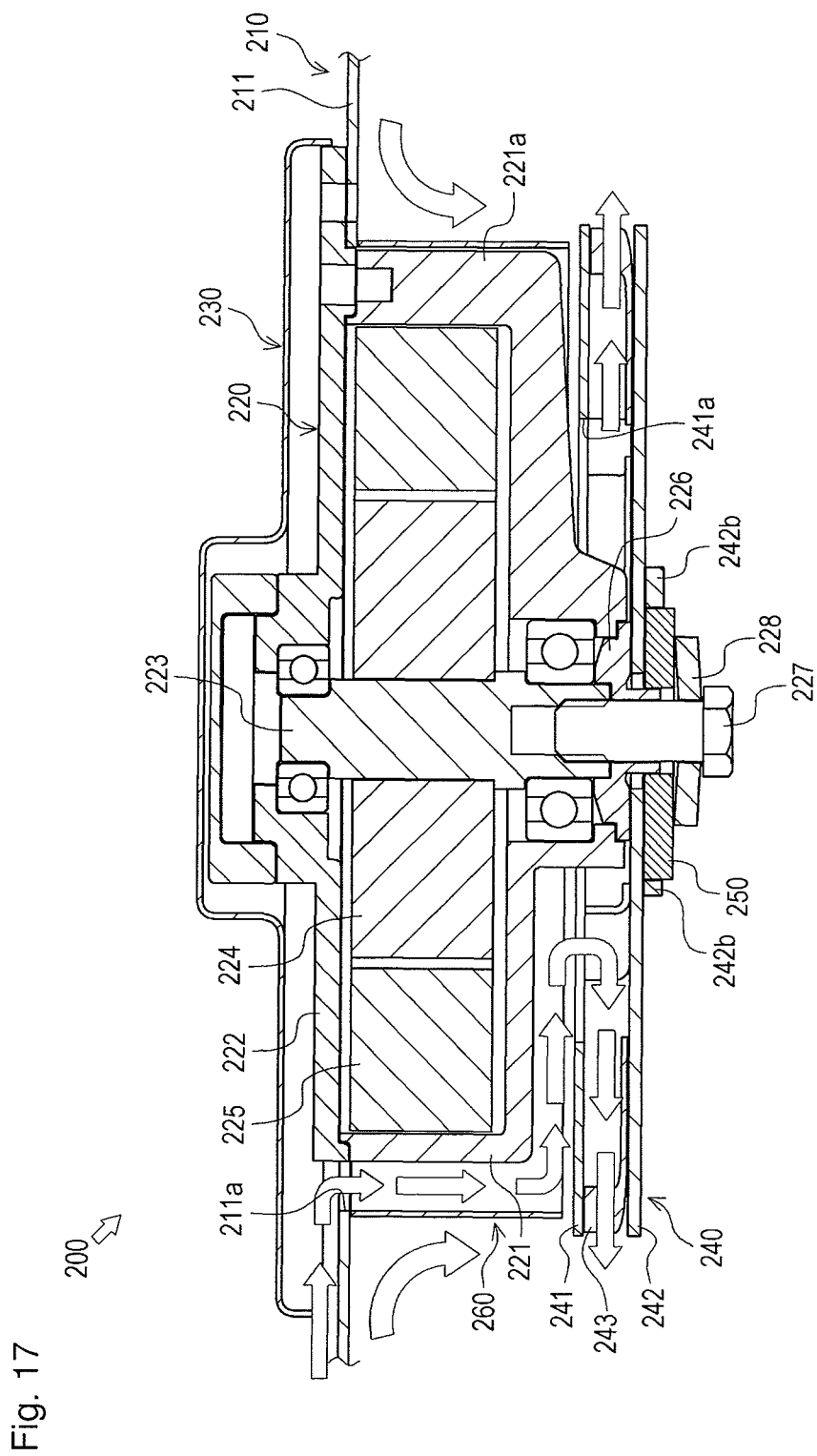
FIG. 17 is a cross-sectional view along the line B-B illustrating how air flows.

Specifically, as shown in FIG. 17, air on the exterior of the mower deck 210 (above the mower deck 210) flows into the motor cover 230 (below the motor cover 230) through gaps between the motor cover 230 and the top surface 211 of the mower deck 210.

The air flowing into the motor cover 230 flows into the interior of the mower deck 210 via the center hole 211a of the mower deck 210. The air flows from above downward through the space between the shroud 260 and the side surface of the lower housing 221 of the work motor 220. In this case, the work motor 220 (side surface of the lower housing 221) is cooled by the air flowing alongside the lower housing 221. In addition, the first fins 221a and the second fins 221b (see FIG. 16 and the like) are formed on the side surface of the lower housing 221, and therefore the surface area of the lower housing 221 is increased as compared to a case where the first fins 221a and the second fins 221b are not formed. Therefore, the lower housing 221 can be cooled effectively by the flowing air. Also, the first fins 221a and the second fins 221b touch the shroud 260. Therefore, the heat of the work motor 220 can be dissipated to the interior of the mower deck 210 via the first fins 221a and the second fins 221b, and also via the shroud 260, enabling the work motor 220 to be cooled effectively.

In particular, in the present embodiment, substantially the entire work motor 220 is positioned in the interior of the mower deck 210. Accordingly, the work motor 220 can be cooled effectively by the airflow in the interior of the mower deck 210. More specifically, not only is airflow generated in the interior of the mower deck 210 by the fan 240, but airflow is also generated accompanying rotation of the rotary blade 250. This airflow flows through an area around the work motor 220 (shroud 260), thereby cooling the work motor 220 via the shroud 260.

The air flowing downward through the space between the side surface of the lower housing 221 and the shroud 260 flows toward the interior (in a direction approaching the axis line of the work motor 220) through the space between the bottom surface of the lower housing 221 and the top plate 241 of the fan 240. In this case, the flowing air cools the work motor 220 (bottom surface of the lower housing 221).

The air flowing toward the interior through the space between the bottom surface of the lower housing 221 and the top plate 241 flows into the space between the top plate 241 and the bottom plate 242 via the center hole 241a of the top plate 241. The air is sent outward by the fan blades 243 of the rotating fan 240.

In this way, in the mower 200, the air flow passage is formed along the side surface and bottom surface of the work motor 220. Therefore, the work motor 220 can be cooled effectively. In addition, the work motor 220 can be cooled using air from the exterior of the mower deck 210, which contains fewer foreign bodies (mowed grass (turf), dust particles, and so on) as compared to the air in the interior of the mower deck 210. Therefore, foreign bodies are unlikely to get stuck in the air flow passage, and a reduction in cooling performance can be inhibited.

As noted above, the mower 200 according to the present embodiment includes the rotary blade 250 cutting grass due to being rotationally driven; the mower deck 210 housing the rotary blade 250 in the interior thereof; and the work motor 220 (motor) of which at least a portion is positioned in the interior of the mower deck 210, the work motor 220 rotationally driving the rotary blade 250. Due to this configuration, the work motor 220 can be cooled effectively by the airflow generated within the mower deck 210 accompanying rotation of the rotary blade 250. Accordingly, a reduction in output of the work motor 220 can be inhibited. By positioning at least a portion of the work motor 220 in the interior of the mower deck 210, the work motor 220 can be prevented from interfering with members on a top portion of the mower deck 210 (such as the link mechanism 9, which supports the mower 200). In addition, the space above the mower deck 210 can be used efficiently.

The work motor 220 includes a casing member (the lower housing 221 and the upper housing 222) forming an interior space, and at least a portion of the casing member is positioned in the interior of the mower deck 210. Due to this configuration, the casing member of the work motor 220 can be cooled by air flowing within the mower deck 210.

The work motor 220 includes the rotor 224 and the stator 225, which obtain the rotational drive power, and at least a portion of the rotor 224 or at least a portion of the stator 225 is positioned in the interior of the mower deck 210. Due to this configuration, the rotor 224 or the stator 225 of the work motor 220 can be cooled by air flowing within the mower deck 210.

The work motor 220 includes the rotor 224 and the stator 225, which obtain the rotational drive power, and at least a portion of the rotor 224 and at least a portion of the stator 225 are positioned in the interior of the mower deck 210. Due to this configuration, the rotor 224 and the stator 225 of the work motor 220 can be cooled by air flowing within the mower deck 210.

The mower 200 further includes a guide member (the shroud 260 and the fan 240), which forms an air flow passage along the work motor 220, the air flow passage connecting the interior and exterior of the mower deck 210. Due to this configuration, the work motor 220 can be cooled effectively by air flowing from the exterior of the mower deck 210 to the interior.

In addition, the guide member includes the shroud 260 (first guide member), which is positioned so as to face the side surface of the work motor 220. Due to this configuration, the side surface of the work motor 220 can be cooled effectively.

The work motor 220 includes at least one fin (the first fin 221a and the second fin 221b), which is formed so as to extend outward from the side surface, and such that an outer edge portion touches the shroud 260. Due to this configuration, the surface area of the work motor 220 can be increased, and the work motor 220 can be cooled effectively. In addition, heat can be dissipated via the fin and the shroud 260, and the work motor 220 can be cooled more effectively. Also, due to the first fin 221a and the second fin 221b touching the shroud 260, deformation of or damage to the shroud 260 can be inhibited.

In addition, the guide member includes the top plate 241 of the fan 240 (second guide member), which is positioned so as to face the bottom surface of the work motor 220. Due to this configuration, the bottom surface of the work motor 220 can be cooled effectively.

In addition, the mower 200 further includes the fan 240, which sends air from the exterior of the mower deck 210 to the interior via the air flow passage. Due to this configuration, an amount of airflow can be increased, and the work motor 220 can be cooled more effectively.

In addition, the mower 200 further includes the fan 240, which is positioned below the work motor 220 and sends air from the exterior of the mower deck 210 to the interior via the air flow passage, the mower 200 having the second guide member formed by the top plate 241 (top surface) of the fan 240. Due to this configuration, the fan 240 and the second guide member can serve dual purposes.

Moreover, the fan 240 is driven by the work motor 220. Due to this configuration, there is no need to provide a separate drive source driving the fan 240.

The mower 200 according to the present embodiment is an embodiment of a mower according to the present invention, and various concrete configurations can be altered as desired within the technical scope of the present invention.

A number of work motors 220 provided to the mower 200 is not particularly limited. In addition, a configuration is also possible in which a plurality of rotary blades 250 are rotationally driven by a single work motor 220.

A number of the first fins 221a and second fins 221b is not particularly limited. By increasing the number of first fins 221a and second fins 221b, the surface area of the work motor 220 (lower housing 221) can be increased.

A configuration is also possible in which the fan 240 is not provided to the mower 200. In this case, air can be caused to flow accompanying the rotation of the rotary blade 250.

Furthermore, the fan 240 is not limited to being positioned below the work motor 220, but can be placed in any desired position. For example, a configuration is possible in which the fan 240 is positioned above the work motor 220 and air is sent downward (toward the interior of the mower deck 210).

In the present embodiment, substantially the entire work motor 220 is positioned in the interior of the mower deck 210; however, the present invention is not limited to this. For example, only a portion of the lower housing 221 may be positioned in the interior of the mower deck 210, or the lower housing 221 and the upper housing 222 (i.e., the entire work motor 220) may be positioned in the interior of the mower deck 210.

In the present embodiment, the rotor 224 and the stator 225 of the work motor 220 are positioned in the interior of the mower deck 210; however, a configuration is also possible in which only a portion of the rotor 224 and the stator 225 is positioned in the interior of the mower deck 210. In addition, a configuration is also possible in which only one of the rotor 224 and the stator 225 is positioned in the interior of the mower deck 210.

Hereafter, a modification of a mower according to the present invention is described. The modification described below is a modification of the mower 200 according to the second embodiment. Thus, identical reference numerals are assigned to components having substantially identical configurations to those of the mower 200 according to the second embodiment, and descriptions thereof are omitted where appropriate. Moreover, the modification that follows is a modification of the mower 200 according to the second embodiment; however, the mower 100 according to the first embodiment can also be modified in a similar way.

Figure 18:
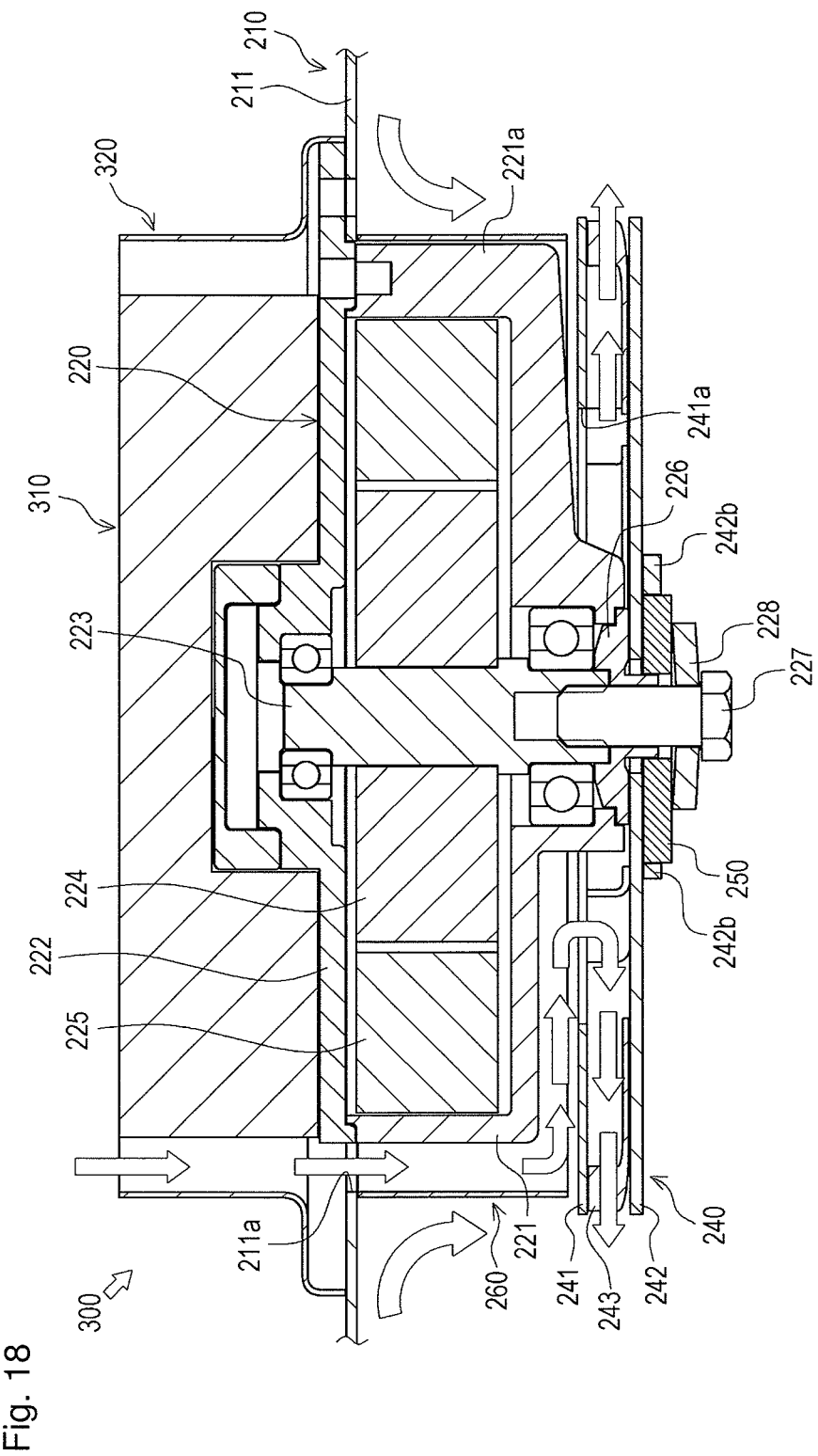
FIG. 18 is a cross-sectional view illustrating a mower according to a first modification.

First, a mower 300 according to a first modification is described with reference to FIG. 18. The mower 300 primarily differs from the mower 200 according to the second embodiment in that the mower 300 is capable of cooling a controller 310, which controls the work motor 220, together with the work motor 220. A specific description follows.

The controller 310 controls the work motor 220. The controller 310 is configured by a memory, a calculation processor, and the like. Programs controlling the work motor 220 and various kinds of data are stored by the controller 310. The controller 310 is formed in a substantially cylindrical shape having an axis line oriented in the vertical direction. The controller 310 is placed on a top portion of the work motor 220.

The mower 300 includes an upper shroud 320 instead of the motor cover 230 according to the second embodiment. The upper shroud 320 foul's an air flow passage. The upper shroud 320 is formed in a substantially cylindrical shape having an axis line oriented in the vertical direction. An inner diameter of the upper shroud 320 is formed so as to be larger than the diameter of the controller 310. A vertical direction breadth of the upper shroud 320 is formed so as to be substantially identical to the vertical direction breadth of the controller 310.

The upper shroud 320 configured in this way is placed on the top surface 211 such that the upper shroud 320 makes contact with the top surface 211 of the mower deck 210. The upper shroud 320 is positioned such that the axis line of the upper shroud 320 matches the axis line of the work motor 220. Thereby, the upper shroud 320 is positioned in a state leaving a predetermined gap open between the upper shroud 320 and the side surface of the controller 310.

In the mower 300 configured in this way, when the fan 240 and the rotary blade 250 are rotationally driven, air on the exterior of the mower deck 210 flows downward from above through a space between the upper shroud 320 and the side surface of the controller 310. In this case, the controller 310 is cooled by the air flowing alongside the controller 310. The air flows into the interior of the mower deck 210 and cools the work motor 220.

Figure 19:
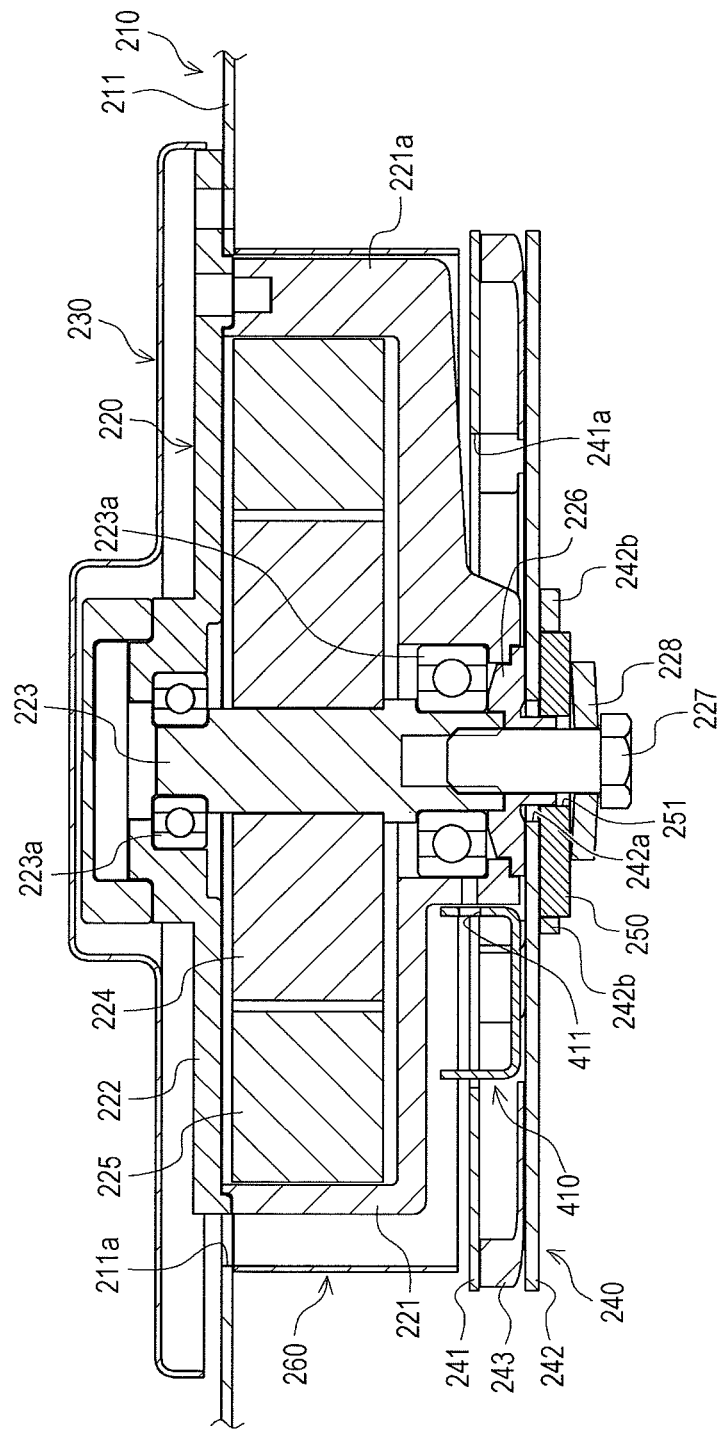
FIG. 19 is a cross-sectional view illustrating a mower according to a second modification.
Figure 20:
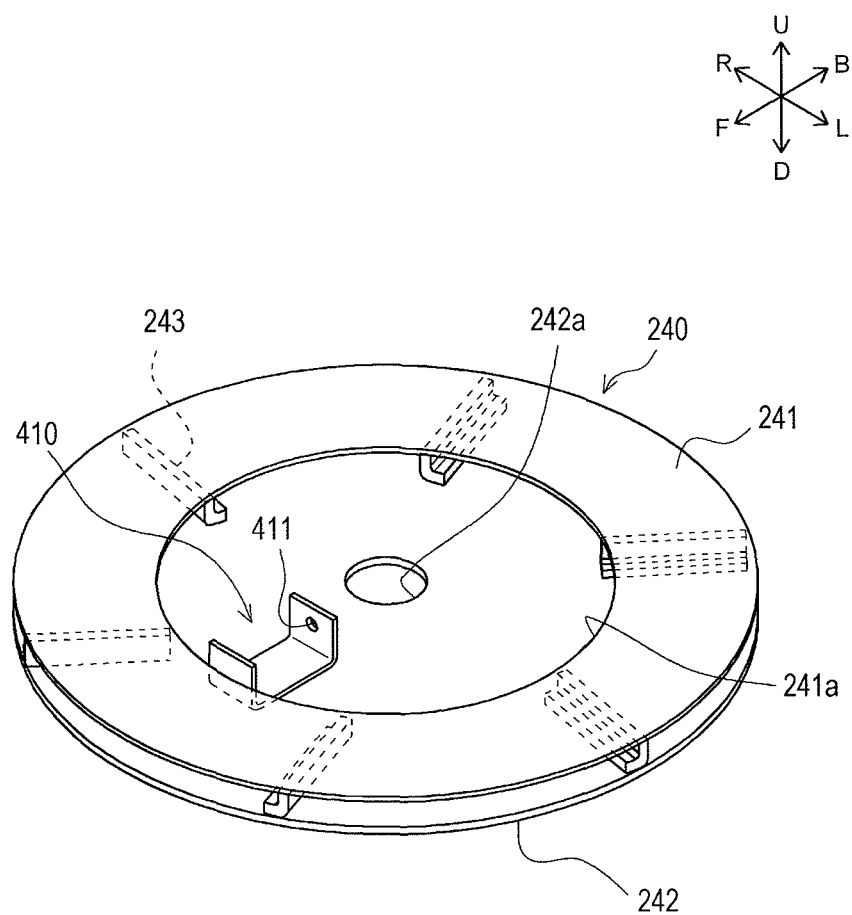
FIG. 20 is an overhead perspective view of a fan and a scraper according to the second modification.

Next, a mower 400 according to a second modification is described with reference to FIGS. 19 and 20. The mower 400 primarily differs from the mower 200 according to the second embodiment in that the mower 400 includes a scraper 410 that removes foreign bodies clinging to the fan 240. A specific description follows.

The scraper 410 is formed by bending a substantially rectangular plate-shaped member. Specifically, the scraper 410 is formed in substantially a "U" shape in a side view by bending upward two end portions of a horizontally positioned plate-shaped member. A through-hole 411 is formed on a side surface on an interior of the scraper 410.

The scraper 410 is positioned in an interior of the center hole 241a of the fan 240. A bolt (not shown in the drawings) is inserted through the through-hole 411 from the outer side, and the bolt is fastened to the lower housing 221, thereby fixating the scraper 410 to the work motor 220. In this state, a bottom surface of the scraper 410 is positioned close to but not touching the bottom plate 242 of the fan 240. An outer side surface of the scraper 410 is positioned close to but not touching an edge of the center hole 241a of the top plate 241.

In the mower 400 configured in this way, the fan 240 rotates relative to the scraper 410. When the fan 240 rotates, foreign bodies (for example, mowed grass (turf)) clinging to the top surface of the bottom plate 242 and the edge of the center hole 241a are removed by the scraping of the scraper 410. Thereby, a reduction in air circulation performance of the fan 240 can be prevented.

Moreover, a method of fixating the scraper 410 is not limited to that of the present modification (fixation by a bolt).

Next, a mower 500 according to a third modification is described with reference to FIGS. 21A and 21B. The mower 500 primarily differs from the mower 200 according to the second embodiment in that the air flow passage is opened and closed using a thermostat 510. A specific description follows.

The thermostat 510 vertically displaces (changes a position of) the motor cover 230 in response to a temperature of the work motor 220. The thermostat 510 is formed using a bimetal or the like. The thermostat 510 extends to become vertically long when the temperature rises, and contracts when the temperature drops. The thermostat 510 is positioned between the motor cover 230 and the upper housing 222 of the work motor 220. The thermostat 510 is placed on the work motor 220, and can thus operate in response to the temperature of the work motor 220.

Figure 21A:
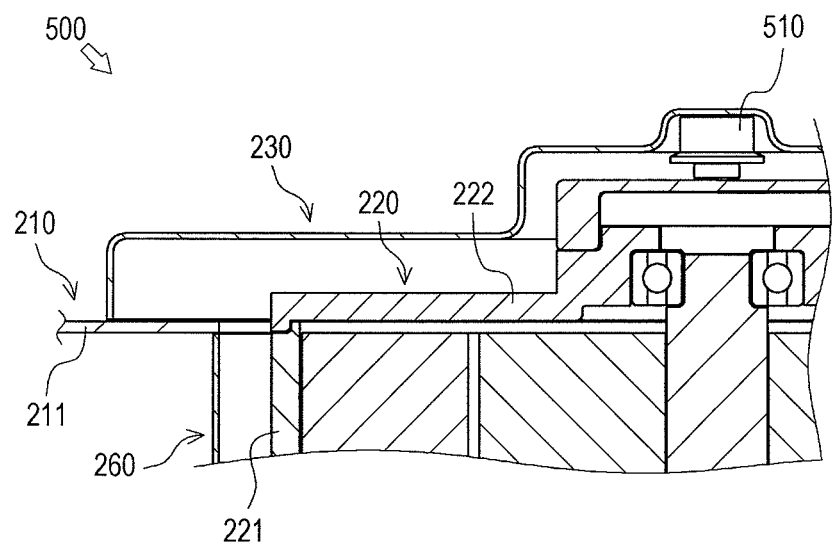
FIG. 21A is an enlarged cross-sectional view of a mower according to a third modification in a state where a temperature of a work motor is low.

In the mower 500 configured in this way, in a case where the temperature of the work motor 220 is low, as shown in FIG. 21A, the thermostat 510 contracts. In this case, the motor cover 230 displaces downward and an outer peripheral end portion of the motor cover 230 makes contact with the top surface 211 of the mower deck 210. In this way, the air flow passage is closed by the motor cover 230.

In this state, air outside the mower deck 210 cannot flow into the interior of the motor cover 230. Accordingly, even when the fan 240 rotates, air outside the mower deck 210 does not flow into the interior of the mower deck 210. In this way, in a case where the temperature of the work motor 220 is low, there is little need to cool the work motor 220, and therefore the flow of air into the interior of the mower deck 210 is regulated. Accordingly, an amount of airflow of the fan 240 can be restrained, and a workload of the work motor 220 can be reduced.

Figure 21B:
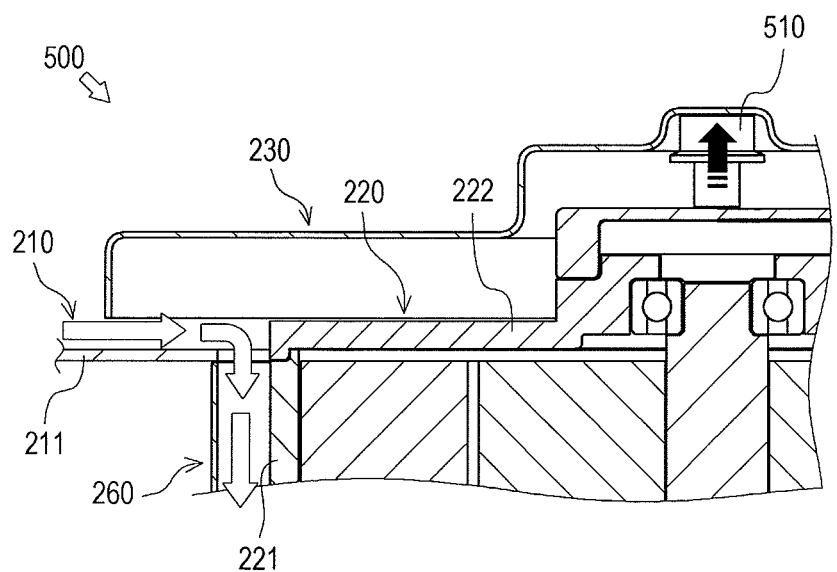
FIG. 21B is an enlarged cross-sectional view of the mower in a state where the temperature of the work motor is high.

As shown in FIG. 21B, in a case where the temperature of the work motor 220 becomes high, the thermostat 510 extends vertically in response to the temperature of the work motor 220. In this case, the motor cover 230 displaces upward and a gap is formed between an outer peripheral end portion of the motor cover 230 and the top surface 211 of the mower deck 210. In this way, the air flow passage is opened by the upward displacement of the motor cover 230.

In this state, air outside the mower deck 210 can flow into the interior of the mower deck 210 via the gap between the outer peripheral end portion of the motor cover 230 and the top surface 211 of the mower deck 210. Accordingly, the work motor 220 can be cooled by the air. The thermostat 510 extends to become longer as the temperature of the work motor 220 increases. Therefore, as the temperature of the work motor 220 increases, air outside the mower deck 210 can more easily flow into the interior of the mower deck 210 and the work motor 220 can be cooled effectively.

Moreover, in the mower 500, the motor cover 230 is displaced vertically and the air flow passage is opened and closed using the thermostat 510. However, the present modification is not limited to the thermostat 510, and a configuration is also possible in which the air flow passage opens and closes using another mechanism (for example, a temperature sensor detecting the temperature of the work motor 220, a vertically expanding and contracting actuator, or the like).

Moreover, a configuration of a lawn mower that includes the mower according to the present invention is not limited to the lawn mower 1 described above (see FIGS. 1 and 2). Specifically, the mower according to the present invention is not limited to a riding type (where grass cutting work is performed by a worker riding the mower) or a non-riding type (where grass cutting work is performed without the worker riding the mower), but can also be applied to various lawn mowers having desired configurations. In addition, the mower according to the present invention can be applied to a lawn mower traveling due to electric power (an electric lawn mower) as well as to a lawn mower traveling due to engine power.

Figure 22:
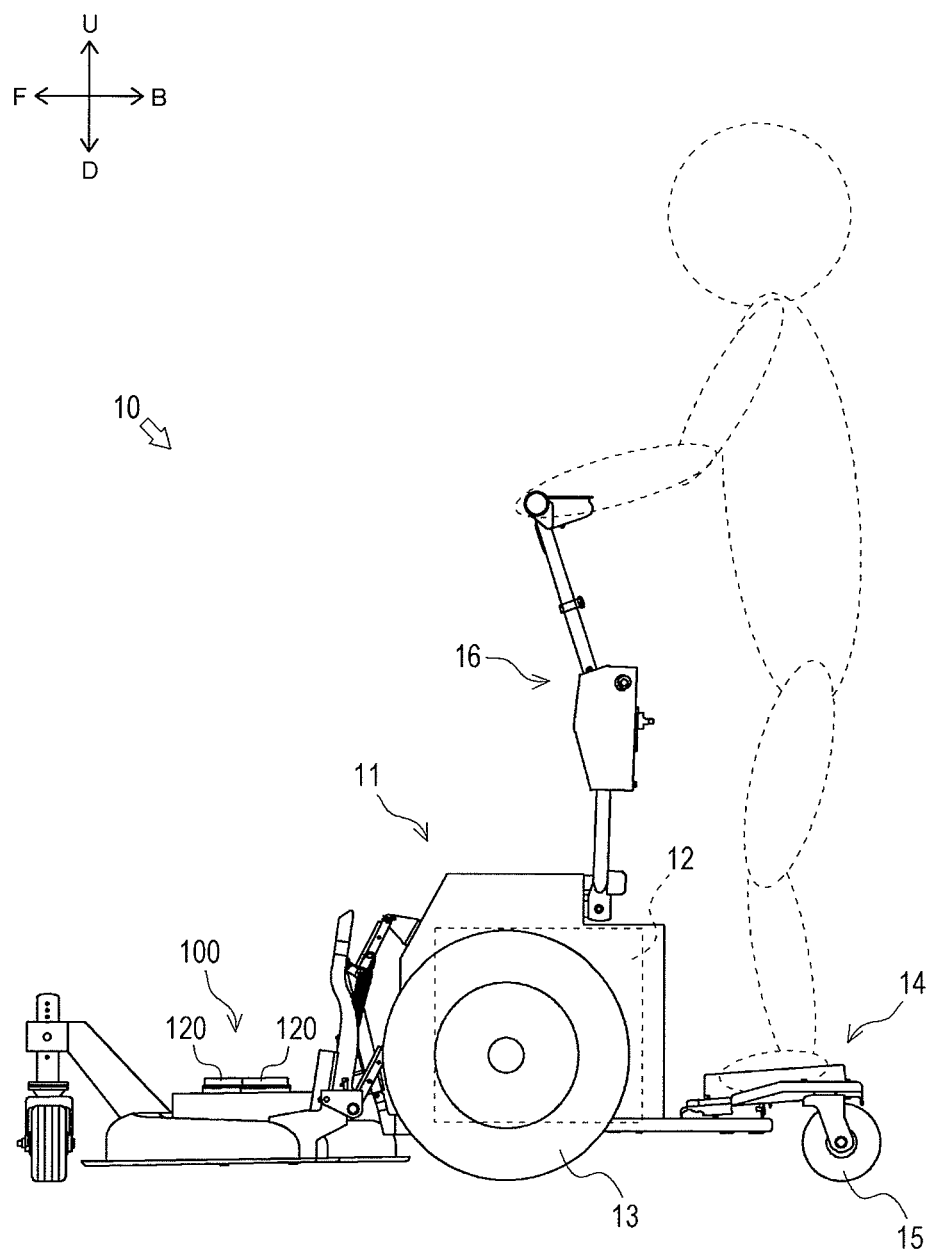
FIG. 22 is a lateral view illustrating another configuration of a lawn mower.

For example, as shown in FIG. 22, the mower (exemplified in FIG. 22 by the mower 100) may also be applied to a lawn mower 10, in which the worker does not sit down but instead rides standing up. The lawn mower 10 includes a traveling vehicle body 11, a motor section 12, drive wheels 13, a platform 14, coupled driving wheels 15, a handle 16, and the mower 100.

The traveling vehicle body 11 is supported by a left-right pair of the drive wheels 13. The motor section 12 driving the left-right pair of drive wheels 13 is provided to the traveling vehicle body 11. The platform 14 where the worker rides standing is connected to a rear portion of the traveling vehicle body 11. A left-right pair of the coupled driving wheels 15 are provided to a rear portion of the platform 14. The handle 16 is provided to a top portion of the traveling vehicle body 11 so as to extend upward. The mower 100 is coupled to a front portion of the traveling vehicle body 11.

In the lawn mower 10 configured in this way, the worker can stably ride the mower 10 by gripping the handle 16 while mounted on the platform 14. The worker can independently drive each of the left-right pair of drive wheels 13 and can cause the lawn mower 10 to travel as desired by performing a predetermined operation (for example, swinging the handle 16 forward/rearward or left/right, displacing the center of gravity of the worker's body, and the like).

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A mower comprising:
    at least one rotationally driven grass cutting blade;
    at least one motor having a motor housing and being configured to cause rotation of the grass cutting blade;
    a mower deck having an upper surface and an outer wall that extends down from the upper surface, said outer wall and said upper surface defining an interior that houses the grass cutting blade;
    at least a part of the motor extending into the interior of the mower deck;
    at least another part of the motor extending above the upper surface of the mower deck;
    at least one guide member surrounding and being spaced apart from a portion of the motor housing of said motor; and
    said at least one guide member being located entirely in the interior of the mower deck and below the upper surface of the mower deck,
    wherein an air flow from outside the mower deck moves radially inwards inside the interior of the mower deck towards a motor shaft and is guided by the at least one guide member,
    wherein the outer wall of the mower deck surrounds the grass cutting blade and the at least one guide member, and
    wherein the at least one guide member defines an annular air flow passage along an outside of the motor, said air flow passage connecting the interior and an exterior of the mower deck.

2. The mower according to claim 1, wherein the part of the motor extending into the interior of the mower deck comprises a part of the motor housing of the motor.

3. The mower according to claim 1, wherein the part of the motor extending into the interior of the mower deck comprises a part of a rotor of the motor.

4. The mower according to claim 1, wherein the part of the motor extending into the interior of the mower deck comprises a part of a stator of the motor.

5. The mower according to claim 1, wherein the motor comprises at least one outwardly extending fin which extends toward and/or contacts the at least one guide member.

6. The mower according to claim 1, further comprising a second guide member arranged so as to face a bottom surface of the motor.

7. The mower according to claim 1, further comprising:
    a fan configured to draw air from the exterior of the mower deck to the interior via the air flow passage.

8. The mower according to claim 7, wherein the fan is positioned below the motor.

9. The mower according to claim 7, wherein the fan is driven by the motor.

10. The mower according to claim 7, wherein the fan is located within the interior of the mower deck.

11. A mower comprising:
at least one rotationally driven grass cutting blade;
a mower deck housing the rotary blade in an interior thereof, said interior defining a common grass cutting space;
at least one motor mounted to the mower deck and being configured to cause rotation of the grass cutting blade;
at least one part of the motor extending into the interior of the mower deck;
at least another part of the motor extending above an upper surface of the mower deck; and
a guide member separate from and spaced from a housing of said motor and being located inside the common grass cutting space of the mower deck and below the upper surface of the mower deck,
wherein an air flow from outside the mower deck moves at least:
    radially inwards inside the interior of the mower deck towards a motor shaft and then is guided axially by the guide member; or
    radially inwards inside the interior of the mower deck towards a motor shaft after being guided axially by the guide member, and
wherein the guide member is located above the grass cutting blade and below the upper surface of the mower deck, and
wherein the guide member comprises:
    a center axis arranged parallel to an axis of the motor housing;
    an annular upper end that is located adjacent an inside surface of the mower deck; and
    an axial length that is less than an axial length of the motor housing, and
wherein the at least one guide member defines an annular air flow passage along an outside of the motor, said air flow passage connecting the interior and an exterior of the mower deck.

12. A mower comprising:
a traveling vehicle body;
at least one rotationally driven grass cutting blade;
a mower deck housing the rotary blade in an interior thereof;
said mower deck being suspended or movably mounted on the traveling vehicle body;
at least one electric blade motor having a rotor, a stator and a motor housing;
said motor housing being mounted to the mower deck; and
at least one of:
    a portion of the motor housing extending into the interior of the mower deck and another portion of the motor housing extending above an upper surface of the mower deck;
    a portion of the rotor extending into the interior of the mower deck and a portion of the motor extending above an upper surface of the mower deck; and
    a portion of the stator extending into the interior of the mower deck and a portion of the motor extending above an upper surface of the mower deck; and
a guide member surrounded by an outer portion of the mower deck and being radially spaced from said motor housing such that the guide member is mounted inside the mower deck and below the upper surface of the mower deck,
wherein an air flow from outside the mower deck moves radially inwards inside the interior of the mower deck towards a motor shaft and is also guided downwards between the guide member and an outside of the motor housing, and
wherein the guide member comprises:
    a center axis arranged parallel to an axis of the motor housing;
    an annular upper end that is located adjacent an inside surface of the mower deck; and
    an axial length that is less than an axial length of the motor housing, and
wherein the at least one guide member has an upper end that extends to the upper surface of the mower deck.

13. The mower according to claim 1, wherein the at least one guide member has an axial length that is shorter than an axial length of the motor.

14. The mower according to claim 11, wherein the guide member is annular and has an axial length that is shorter than an axial length of the motor.

15. The mower according to claim 1, wherein the at least one guide member comprises:
an outer circumferential surface that is greater than an outer circumferential surface of the motor housing;
an inner circumferential surface that is greater than the outer circumferential surface of the motor housing; and
an axial length that is less than an axial length of the motor housing.

16. The mower according to claim 1, wherein the guide member comprises:
a center axis arranged parallel to an axis of the motor housing;
an annular upper end that is located adjacent the upper surface of the mower deck; and
an axial length that is less than an axial length of the motor housing.

17. The mower according to claim 1, wherein the at least one guide member is a separately formed ring-shaped member fastened to the mower deck and wherein the mower deck is movably mounted to a traveling vehicle body of the mower.

18. The mower according to claim 1, wherein an upper end of the at least one guide member is located below an upper-most end of the motor.

* * * * *